(12) United States Patent
Hirata et al.

(10) Patent No.: US 11,181,781 B2
(45) Date of Patent: Nov. 23, 2021

(54) LIQUID CRYSTAL DISPLAY PANEL

(71) Applicants: SAKAI DISPLAY PRODUCTS CORPORATION, Sakai (JP); SHARP KABUSHIKI KAISHA, Sakai (JP)

(72) Inventors: Mitsuaki Hirata, Sakai (JP); Fumikazu Shimoshikiryoh, Sakai (JP)

(73) Assignees: SAKAI DISPLAY PRODUCTS CORPORATION, Sakai (JP); SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/042,851

(22) PCT Filed: Mar. 30, 2018

(86) PCT No.: PCT/JP2018/013613
§ 371 (c)(1),
(2) Date: Dec. 14, 2020

(87) PCT Pub. No.: WO2019/187004
PCT Pub. Date: Oct. 3, 2019

(65) Prior Publication Data
US 2021/0109407 A1    Apr. 15, 2021

(51) Int. Cl.
*G02F 1/1337*    (2006.01)

(52) U.S. Cl.
CPC .. *G02F 1/133707* (2013.01); *G02F 1/133761* (2021.01)

(58) Field of Classification Search
None
See application file for complete search history.

(56) References Cited

U.S. PATENT DOCUMENTS

| 2009/0284703 | A1 | 11/2009 | Shoraku et al. |
| 2015/0116625 | A1* | 4/2015 | Hwang ............. G02F 1/133512 349/57 |
| 2020/0241337 | A1 | 7/2020 | Shimoshikiryoh et al. |

FOREIGN PATENT DOCUMENTS

| JP | 2011-085738 A | 4/2011 |
| JP | 5184618 B2 | 4/2013 |
| WO | 2017/047532 A1 | 3/2017 |

* cited by examiner

*Primary Examiner* — James A Dudek
(74) *Attorney, Agent, or Firm* — ScienBiziP, P.C.

(57) ABSTRACT

A liquid crystal display panel includes a first substrate section that includes a first substrate and pixel electrodes (102). Each pixel electrode (102) includes: a first slitted region (111) in which a plurality of first slits (112A to 112G) extending along a direction parallel to the alignment azimuth of liquid crystal molecules in the first domain are formed; a second slitted region (121) in which a plurality of second slits (122A to 122H) extending along a direction parallel to the alignment azimuth of liquid crystal molecules in the second domain are formed; and a boundary region (131) provided between the first slitted region (111) and the second slitted region (121). No slits are formed in the first and second end portions (131*a*, 131*c*) of the boundary region (131), and at least one third slit (132) is formed in the central portion (131*b*) of the boundary region (131).

7 Claims, 21 Drawing Sheets

LIQUID CRYSTAL DISPLAY PANEL

TECHNICAL FIELD

This invention relates to a liquid crystal display panel whose display mode is a VA mode.

BACKGROUND ART

A liquid crystal display apparatus is a display apparatus which performs display by utilizing a liquid crystal composition. Under one representative displaying method, a liquid crystal composition is sealed in between a pair of substrates; a liquid crystal display panel including this pair of substrates and the liquid crystal composition, these being sandwiched between a pair of polarizers, is irradiated with light from a backlight; and a voltage is applied to the liquid crystal composition in order to change the alignment of the liquid crystal molecules, whereby the amount of light passing through the liquid crystal display panel is controlled. Such a liquid crystal display apparatus has advantages such as a thin profile, light weight, and low power consumption, and therefore is utilized in smartphones, tablet PCs, car navigation systems, and other electronic devices.

In some conventional liquid crystal display panels, one pixel is divided into a plurality of domains (alignment regions), such that liquid crystal molecules are aligned in a different azimuth in each domain, thereby improving viewing angle characteristics. Examples of the method of achieving such alignment division in a pixel are methods that divide a half pixel into four domains of two rows by two columns; currently, a 4D-RTN (4Domain-Reverse Twisted Nematic) mode of Patent Documents 1 and 2, and a 4D-ECB (4Domain-Electrically Controlled Birefringence) mode of Patent Document 2, and the like are under study.

At a boundary between regions of different alignment azimuths of liquid crystal molecules, owing to continuity of the liquid crystal molecules, there are always portions where the alignment direction of liquid crystal molecules is parallel to the polarization axis of one of the polarizers. When liquid crystal displaying is performed in such a state, the aforementioned portions are visible as dark lines because no light is transmitted therethrough, and thus the transmittance and contrast ratio are reduced.

FIG. 21 is a schematic plan view showing one pixel, illustrating an exemplary region in which a dark line 1120 may occur in the liquid crystal display panel of Patent Document 3.

In the aforementioned liquid crystal display panel of Patent Document 3, one pixel is divided into four domains of one column by four rows. More specifically, a pixel 1000 includes four domains 1000a to 1000d in which liquid crystal molecules 1041 have mutually different alignment azimuths (azimuths of tilt). The domains 1000a to 1000d are arranged along the longitudinal direction of the pixel 1000 (i.e., the up-down direction in FIG. 21). Herein, when an azimuth flush with the transverse direction of the pixel 1000 (i.e., the right-left direction in FIG. 21) is defined as 0°, an alignment azimuth of the liquid crystal molecules 1041 in the domain 1000a is 45°; an alignment azimuth of the liquid crystal molecules 1041 in the domain 1000b is 225°; an alignment azimuth of the liquid crystal molecules 1041 in the domain 1000c is 135°; and an alignment azimuth of the liquid crystal molecules 1041 in the domain 1000d is 315°.

Since the alignment azimuth of the liquid crystal molecules 1041 in the domain 1000a is different from the alignment azimuth of the liquid crystal molecules 1041 in the domain 1000b, a portion 1120b of the dark line 1120 extends along the boundary between the domain 1000a and the domain 1000b. Since the alignment azimuth of the liquid crystal molecules 1041 in the domain 1000c is different from the alignment azimuth of the liquid crystal molecules 1041 in the domain 1000d, another portion 1120a of the dark line 1120 extends along the boundary between the domain 1000c and the domain 1000d.

Because of the alignment azimuths of liquid crystal molecules 1041 being thus set, the portion 1120b of the dark line 1120 extends along the boundary between the domain 1000a and the domain 1000b, and the other portion 1120a of the dark line 1120 extends along the boundary between the domain 1000c and the domain 1000d.

What is depicted at 1011 in FIG. 21 is a wiring line.

CITATION LIST

Patent Literature

Patent Document 1: Japanese Patent No. 5184618
Patent Document 2: Japanese Laid-Open Patent Publication No. 2011-85738
Patent Document 3: International Publication No. 2017/047532

SUMMARY OF INVENTION

Technical Problem

The inventors have further conducted a simulation concerning occurrence of dark lines 1120 to observe the alignment states of the liquid crystal molecules.

FIG. 22 is a photographic representation of one pixel, showing a result of simulating occurrence of dark lines 1120. In FIG. 22, liquid crystal molecules 1041 are illustrated as bolt shapes. More specifically, heads of the bolts correspond to bottoms of the cones in FIG. 21. On the other hand, ends of the bolts opposite to their heads, i.e., the tips, correspond to apices of the cones in FIG. 21.

As is clear from FIG. 22, in each region containing a boundary between domains, a double dark line occurs, and also a disclination P1001, P1002 occurs in irregular manners. In other words, the site of the disclination P1001, P1002 differs for each double dark line. For example, in one double dark line, a disclination may occur in the central portion along the transverse direction of the pixel; in another double dark line, a disclination may occur at an end along the transverse direction of the pixel. This is because the location of a disclination is determined based on a balance between the alignment azimuths in the surrounding liquid crystal molecule alignment, and is affected by local variations in the pretilt angle, shape/electric field variations around the pixel electrode, etc., for example.

Therefore, in the aforementioned conventional liquid crystal display panel, the site of occurrence of the disclination P1001, P1002 is varied, thus resulting in a problem of coarse display.

Therefore, a problem to be solved by this invention is to improve on coarseness of display and provide a liquid crystal display panel with an enhanced display quality.

Solution to Problem

A liquid crystal display panel according to one implementation of this invention comprises:

a plurality of rectangular-shaped pixels;

the liquid crystal display panel being a liquid crystal display panel having a display mode that is a VA mode, a first substrate section including a first substrate and pixel electrodes;

a liquid crystal layer provided on the first substrate section, the liquid crystal layer containing liquid crystal molecules; and a second substrate section provided on the liquid crystal layer, the second substrate section including a second substrate and a counter electrode, wherein, the plurality of pixels each include first and second domains arranged along a longitudinal direction of the pixel;

when a direction orthogonal to the longitudinal direction of the pixel is defined as a transverse direction of the pixel and an azimuth flush with the transverse direction of the pixel is defined as 0°, an alignment azimuth of the liquid crystal molecules in the first domain is substantially 45° and an alignment azimuth of the liquid crystal molecules in the second domain is substantially 225°; or an alignment azimuth of the liquid crystal molecules in the first domain is substantially 135° and an alignment azimuth of the liquid crystal molecules in the second domain is substantially 315°;

each pixel electrode includes a first slitted region in which a plurality of first slits extending along a direction that is parallel to the alignment azimuth of the liquid crystal molecules in the first domain are formed, and a second slitted region in which a plurality of second slits extending along a direction that is parallel to the alignment azimuth of the liquid crystal molecules in the second domain are formed, and a boundary region provided between the first slitted region and the second slitted region;

the boundary region includes a first end portion, a central portion, and a second end portion that are arranged along the transverse direction of the pixel; and no slits are formed in the first and second end portions of the boundary region, and at least one third slit is formed in the central portion of the boundary region.

Herein, the aforementioned alignment azimuth of a liquid crystal molecule refers to, in a plan view of the liquid crystal molecule under an applied voltage across the liquid crystal layer, a direction from one end of the liquid crystal molecule along its major axis direction that is at the first substrate section side to the other end of the liquid crystal molecule along its major axis direction that is at the second substrate section side. In this case, when the alignment azimuth of a liquid crystal molecule is said to be 0°, this alignment azimuth corresponds to the rightward direction from one end of the liquid crystal molecule along its major axis direction that is at the first substrate section side (so-called the 3 o'clock direction). In that case, when the alignment azimuth of a liquid crystal molecule is said to be 45°, this alignment azimuth corresponds to an alignment azimuth that results through a 45° counterclockwise rotation from the 0° alignment azimuth of the liquid crystal molecule.

As referred to above, substantially 45° means an angle in the range from 30° to 60°, or an angle in the range from 40° to 50°. As referred to above, substantially 135° means an angle in the range from 150° to 120°, or an angle in the range from 140° to 130°. As referred to above, substantially 225° means an angle in the range from 210° to 240°, or an angle in the range from 220° to 230°. As referred to above, substantially 315° means an angle in the range from 300° to 330°, or an angle in the range from 310° to 320°.

Advantageous Effects of Invention

In a liquid crystal display panel according to this invention, no slits are provided in the first and second end portions of the boundary region, while at least one third slit is provided in the central portion of the boundary region. This makes it possible to improve on coarseness of display and provide an enhanced display quality.

DESCRIPTION OF EMBODIMENTS

Figure 1:
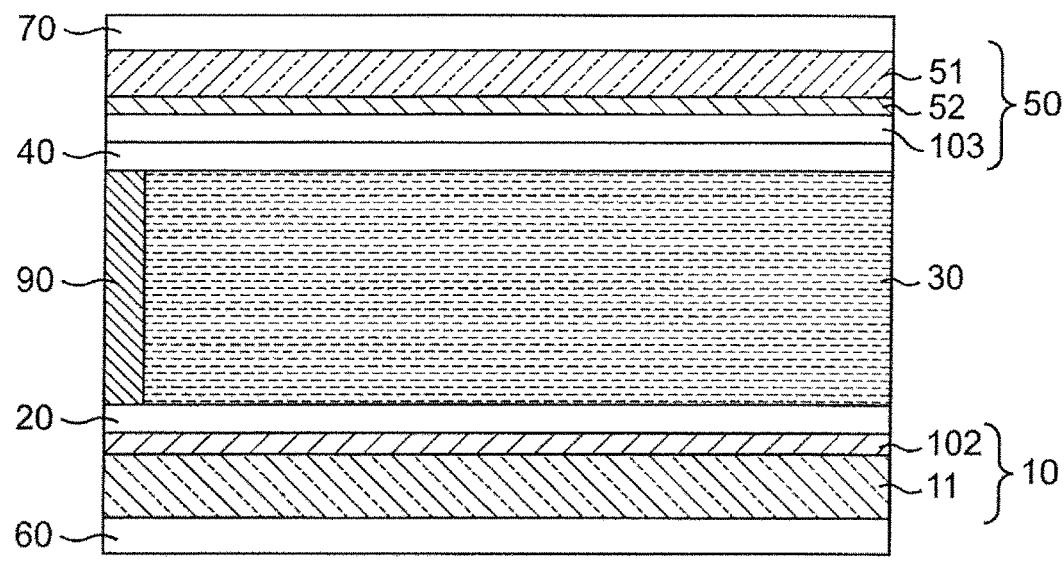
FIG. 1 A schematic cross-sectional view of a liquid crystal display panel according to a first embodiment of the present invention, FIG. 2 A schematic plan view of the liquid crystal display panel according to the first embodiment, FIG. 3 A schematic perspective view for describing the attitudes of liquid crystal molecules according to the first embodiment.

Hereinafter, byway of embodiments illustrated in the drawings, liquid crystal display panels according to this invention will be described in more detail. In the drawings, common portions are denoted by like numerals, with any redundant description being omitted.

First Embodiment

FIG. 1 is a cross-sectional view schematically showing a cross section of a liquid crystal display panel according to a first embodiment of this invention.

The liquid crystal display panel is a liquid crystal display panel whose display mode is a VA mode, including: a first substrate section 10; a first vertical alignment film 20; a liquid crystal layer 30 containing liquid crystal molecules 41 (shown in FIG. 2 and FIG. 3); a second vertical alignment film 40; and a second substrate section 50. The first vertical alignment film 20, the liquid crystal layer 30, the second vertical alignment film 40, and the second substrate section 50 are stacked in this order on the first substrate section 10. Between the first vertical alignment film 20 and the second vertical alignment film 40, a sealing member 90 with which to seal the liquid crystal layer 30 is provided. Herein, light from the first substrate section 10 side passes through the liquid crystal layer 30, and thereafter travels toward the second substrate section 50 side. In other words, the aforementioned light enters into the liquid crystal display panel and then goes out from the liquid crystal display panel at the second substrate section 50 side.

The first substrate section 10 includes a first glass substrate 11 and pixel electrodes 102 provided on an upper surface of the glass substrate 11. Also, thin film transistors 13 (shown in FIG. 3 and FIG. 4) are provided on the upper surface of the glass substrate 11, the thin film transistors 13 being electrically connected to the pixel electrodes 102. Under the first substrate section 10, a first polarizer 60 is disposed. Note that the first glass substrate 11 is an example of a first substrate.

The second substrate section 50 includes a second glass substrate 51, a color filter 52, and a counter electrode 103. Along the thickness direction of the second glass substrate 51, the color filter 52 is opposed to the pixel electrodes 102. On the second substrate section 50, a second polarizer 70 having a polarization axis that is orthogonal to a polarization axis (transmission axis) of the first polarizer 60 is disposed. Note that the second glass substrate 51 is an example of a second substrate.

The pixel electrodes 102 and the counter electrode 103 may each be a transparent electrode of ITO (Indium Tin Oxide), for example.

Figure 2:
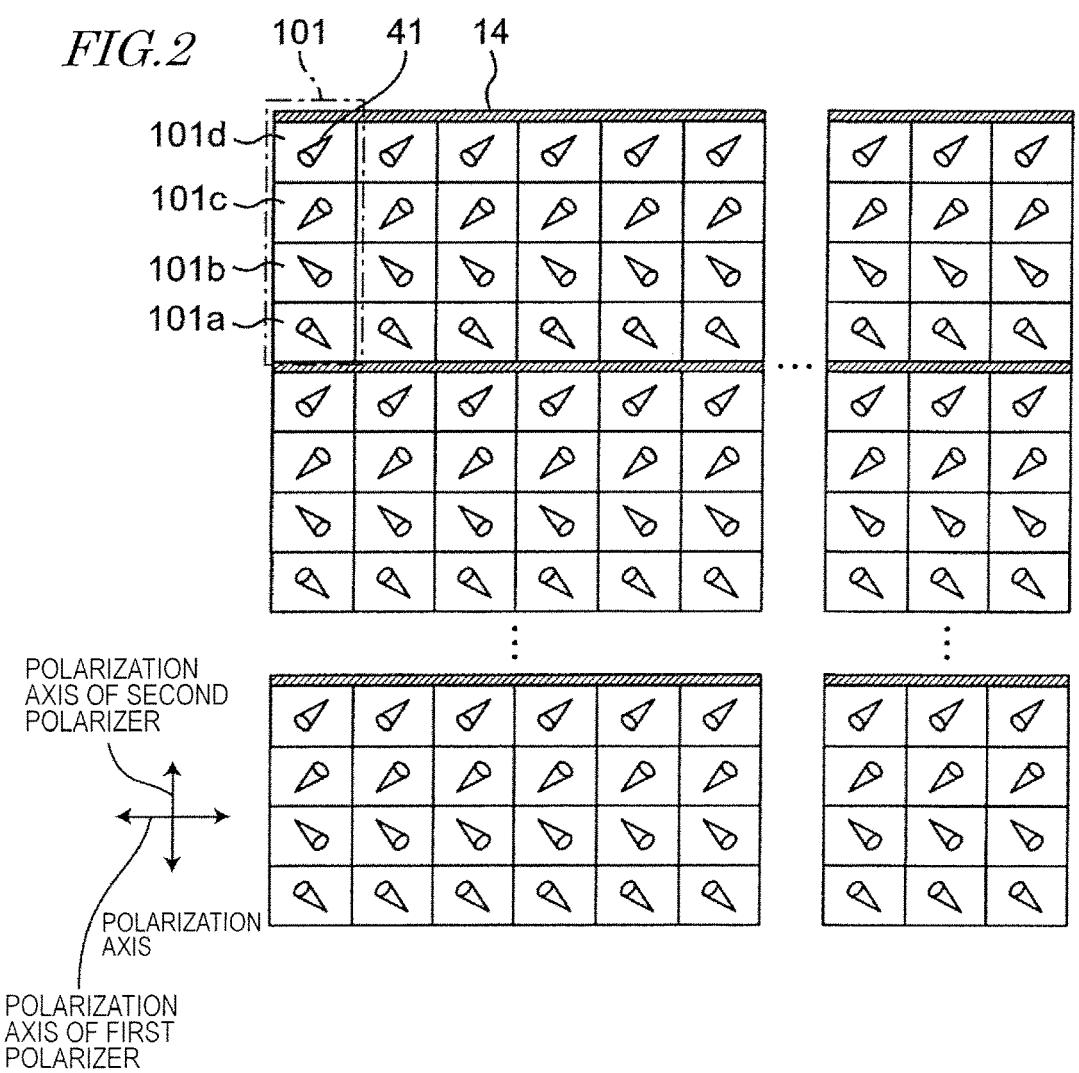

FIG. 2 is a plan view schematically showing the liquid crystal display panel. In FIG. 2, liquid crystal molecules 41 under an applied voltage across the liquid crystal layer 30 are depicted by cone shapes. More specifically, one end of each liquid crystal molecule 41 along its major axis direction that corresponds to the apex of the cone is located at the first substrate section 10 side. On the other hand, the other end of each liquid crystal molecule 41 along the major axis direction that corresponds to the bottom of the cone is located at the second substrate section 50 side.

In the liquid crystal display panel, a plurality of rectangular shaped pixels 101 are arranged in a matrix. Each pixel 101 includes four domains 101a to 101d, which differ from one another in terms of the alignment azimuth of the liquid crystal molecules 41. Moreover, the domains 101a to 101d are arranged along the longitudinal direction of the pixel 101 (i.e., the up-down direction in FIG. 2). Note that the domains 101a and 101c are examples of first domains. The domains 101b and 101d are examples of second domains.

When the liquid crystal display panel is viewed from the second substrate section 50 side, assuming that an azimuth from one end of the liquid crystal molecule 41 along its major axis direction toward the right side in FIG. 2 is defined as 0°, then an alignment azimuth of the liquid crystal molecules 41 in the domain 101a is substantially 135°; an alignment azimuth of the liquid crystal molecules 41 in the domain 101b is substantially 315°; an alignment azimuth of the liquid crystal molecules 41 in the domain 101c is substantially 45°; and an alignment azimuth of the liquid crystal molecules 41 in the second domain is substantially 225°. These alignment azimuths may be conferred by irradiating a photoalignment film with polarized UV light through a mask, for example.

Moreover, in order to enhance the transmittance of the liquid crystal layer 30, the transverse direction of the pixel 101 is set so as to be parallel to the polarization axis of the first polarizer 60.

Herein, the alignment azimuth of a liquid crystal molecule 41 is an orientation that does not take into account any tilt angle (pretilt angle) with respect to the normal direction of the upper surface of the first glass substrate 11. More specifically, the alignment azimuth of a liquid crystal molecule 41 means a direction in which the other end (i.e., the end at the second substrate section 50 side) of the liquid crystal molecule 41 along its major axis direction is oriented, when the liquid crystal molecule 41 is projected onto the upper surface of the first glass substrate 11, i.e., when the liquid crystal molecule 41 is viewed from the second substrate section 50 side. For example, the liquid crystal molecule 41 are arranged in such a manner that: if the crystal orientation of a liquid crystal molecule 41 is 10°, when that liquid crystal molecule 41 is viewed from the second substrate section 50 side, the other end of the liquid crystal molecule 41 along its major axis direction) constitutes 10° with respect to a direction parallel to the transverse direction of the pixel 101. Note that any angle in a counterclockwise direction with respect to the direction parallel to the transverse direction of the pixel 101 is assumed to have a positive value.

As referred to above, substantially 45° means an angle in the range from 30° to 60°, or an angle in the range from 40° to 50°. As referred to above, substantially 135° means an angle in the range from 150° to 120°, or an angle in the range from 140° to 130°. As referred to above, substantially 225° means an angle in the range from 210° to 240°, or an angle in the range from 220° to 230°. As referred to above, substantially 315° means an angle in the range from 300° to 330°, or an angle in the range from 310° to 320°.

In FIG. 2, a gate line extending along the transverse direction of the pixels 101 is depicted at 14.

Figure 3:
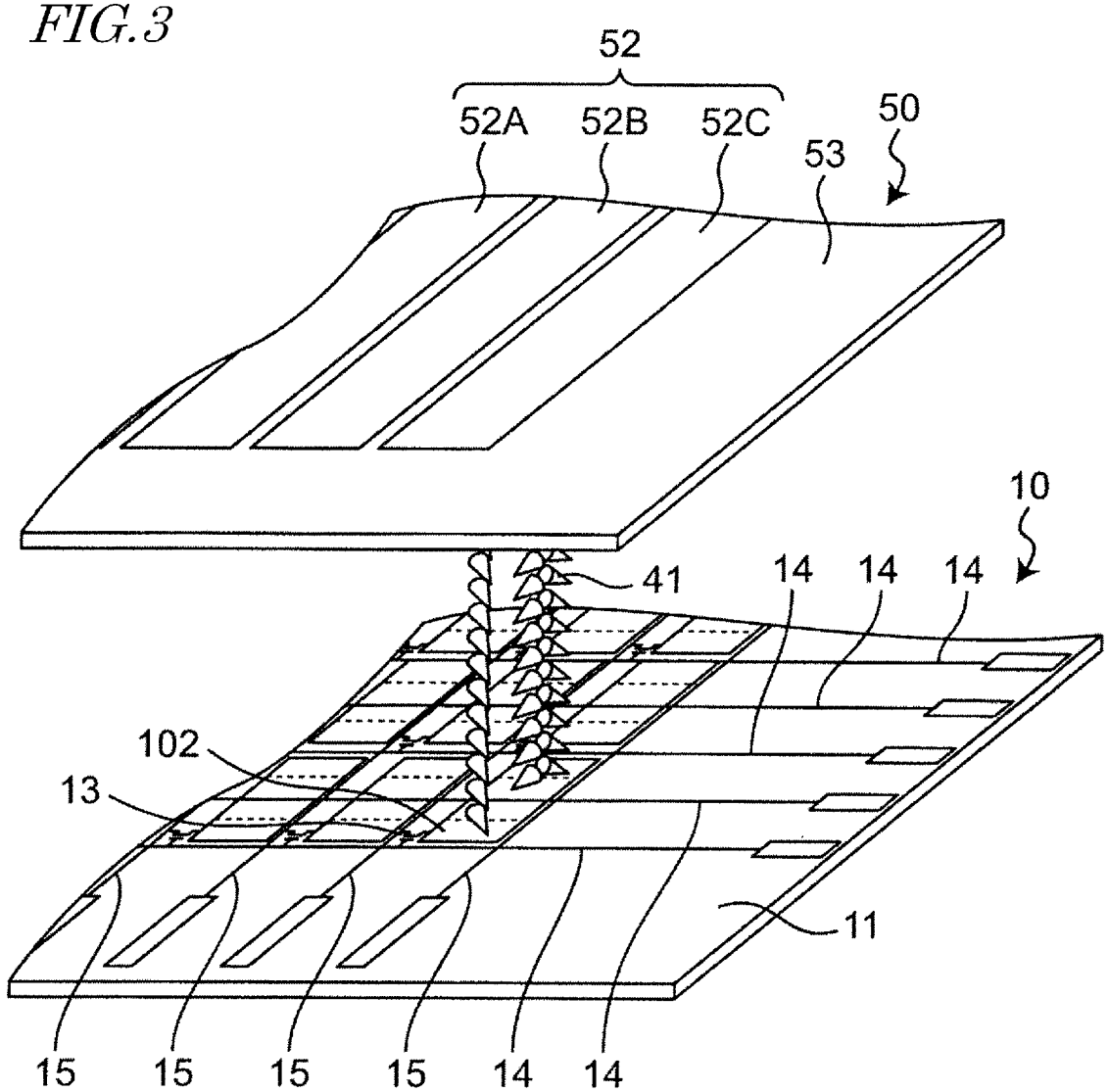

FIG. 3 is a schematic perspective view for describing the attitudes of the liquid crystal molecules 41 under an applied voltage across the liquid crystal layer 30.

In the domain 101a, the liquid crystal molecules 41 have an essentially constant tilt angle between the pixel electrode 102 and the counter electrode 103. Similarly, in each of the domains 101b, 101c and 101d, the liquid crystal molecules 41 have an essentially constant tilt angle between the pixel electrode 102 and the counter electrode 103. Herein, the tilt angle of a liquid crystal molecule 41 means an angle which the major axis of the liquid crystal molecule 41 constitutes with the upper surface of the glass substrate 11.

A plurality of pixel electrodes 102 are disposed in a matrix, so as to be in rectangular-shaped regions. Each such region is a region that is delineated by a plurality of gate lines 14, 14, . . . , which are parallel to one another and a plurality of source lines 15, 15, . . . , which are parallel to one another.

The gate lines 14, 14, . . . are provided on the first glass substrate 11, and extend along a direction which is parallel to the transverse direction of the pixels 101. Moreover, each gate line 14 is electrically connected to gates of thin film transistors 13.

The source lines 15 are provided on the first glass substrate 11, and extend along a direction which is parallel to the longitudinal direction of the pixels 101. Moreover, each source line 15 is electrically connected to sources of thin film transistors 13.

As the thin film transistors 13, those having channels made by using silicon or an oxide semiconductor are suitably used, for example. As such an oxide semiconductor, for example, a compound composed of indium, gallium, zinc, and oxygen (In—Ga—Zn—O), a compound composed of indium, tin, zinc, and oxygen (In-Tin-Zn—O), or a compound composed of indium, aluminum, zinc, and oxygen (In—Al—Zn—O) can be used.

As the gate lines 14 and the source lines 15, those which are commonly used in the field of liquid crystal display panels can be used, e.g., a metal such as copper, titanium, chromium, aluminum, or molybdenum, or an alloy thereof, etc.

The color filter 52 is composed of red color filters 52A, green color filters 52B, and blue color filters 52C. The red color filters 52A, the green color filters 528, and the blue color filters 52C are each located above a plurality of pixel electrodes 102 that are arranged along the longitudinal direction of the pixels 101, and extend along the longitudinal direction of the pixels 101.

Figure 4:
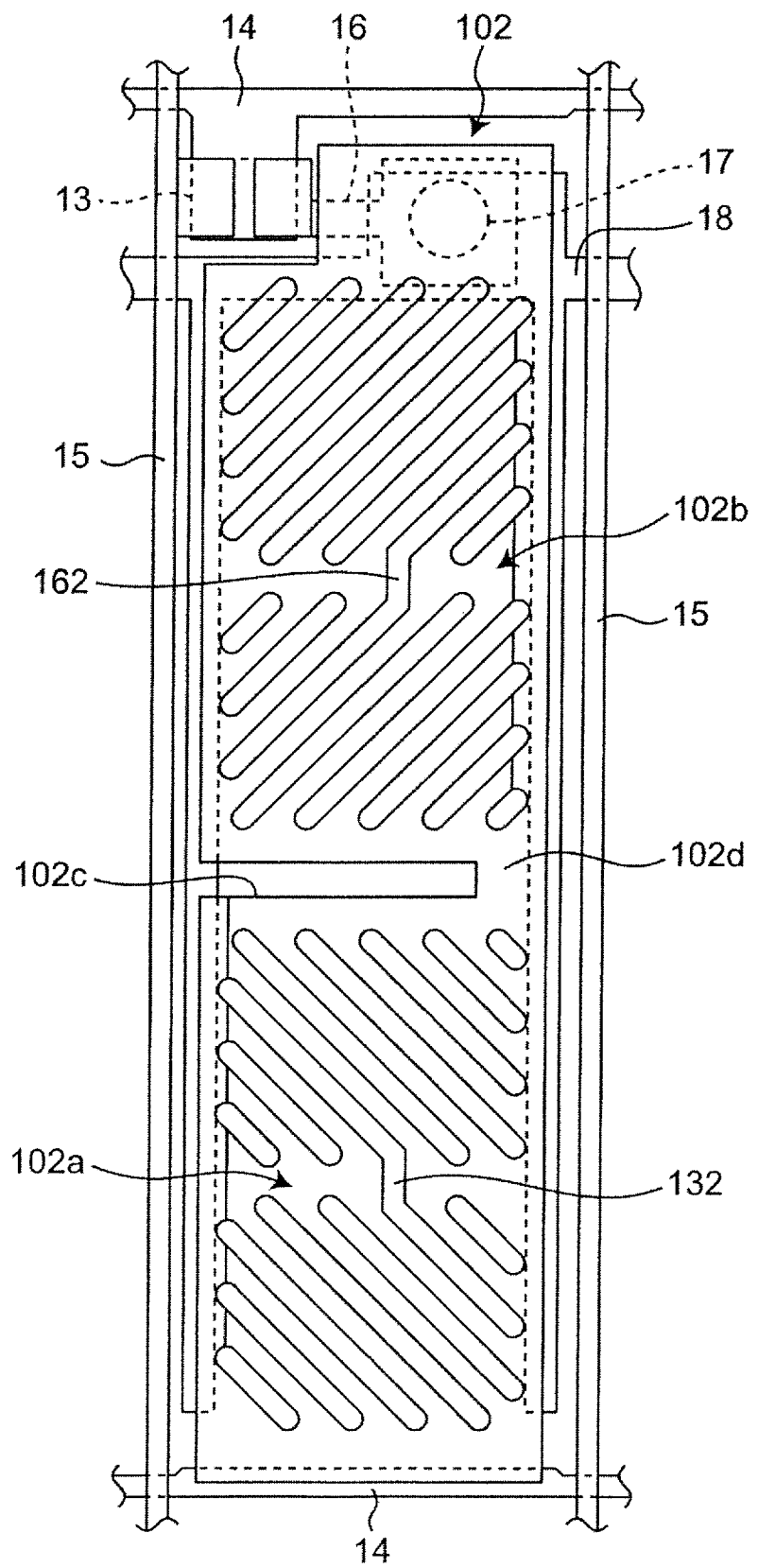
FIG. 4 An enlarged plan view of a pixel electrode according to the first embodiment and its neighborhood.

FIG. 4 is an enlarged plan view of a pixel electrode 102 and its neighborhood.

A drain of the thin film transistor 13 is electrically connected to a drain line 16. The drain line 16 is electrically connected also to the pixel electrode 102, via an electrical conductor in a contact hole 17.

Within each rectangular-shaped region that is delineated by the gate lines 14, 14, . . . and the source lines 15, 15, . . . , a capacitor line 18 is also formed. The capacitor line 18 is formed so as to extend along three sides of the pixel electrode 102, and is electrically connected to the pixel electrode 102.

The pixel electrode 102 includes: a first pixel electrode portion 102a opposed to the domains 101a and 101b along the thickness direction (i.e., a direction perpendicular to the plane of the figure of FIG. 4); and a second pixel electrode portion 102b opposed to the domains 101c and 101d along the thickness direction. Between the first pixel electrode portion 102a and the second pixel electrode portion 102b, a rectangular-shaped recess 102c and a bridging portion 102d are provided along the transverse direction of the pixel 101.

The recess 102c extends from one of the pair of longer sides of the pixel electrode 102 to the other one of the pair of longer sides. In other words, the recess 102c is formed so as to extend along the transverse direction of the pixel 101.

The bridging portion 102d is a portion that connects between the first pixel electrode portion 102a and the second pixel electrode portion 102b, and is formed so as to adjoin the recess 102c. The bridging portion 102d is located closer to the other one of the pair of longer sides.

Figure 5:
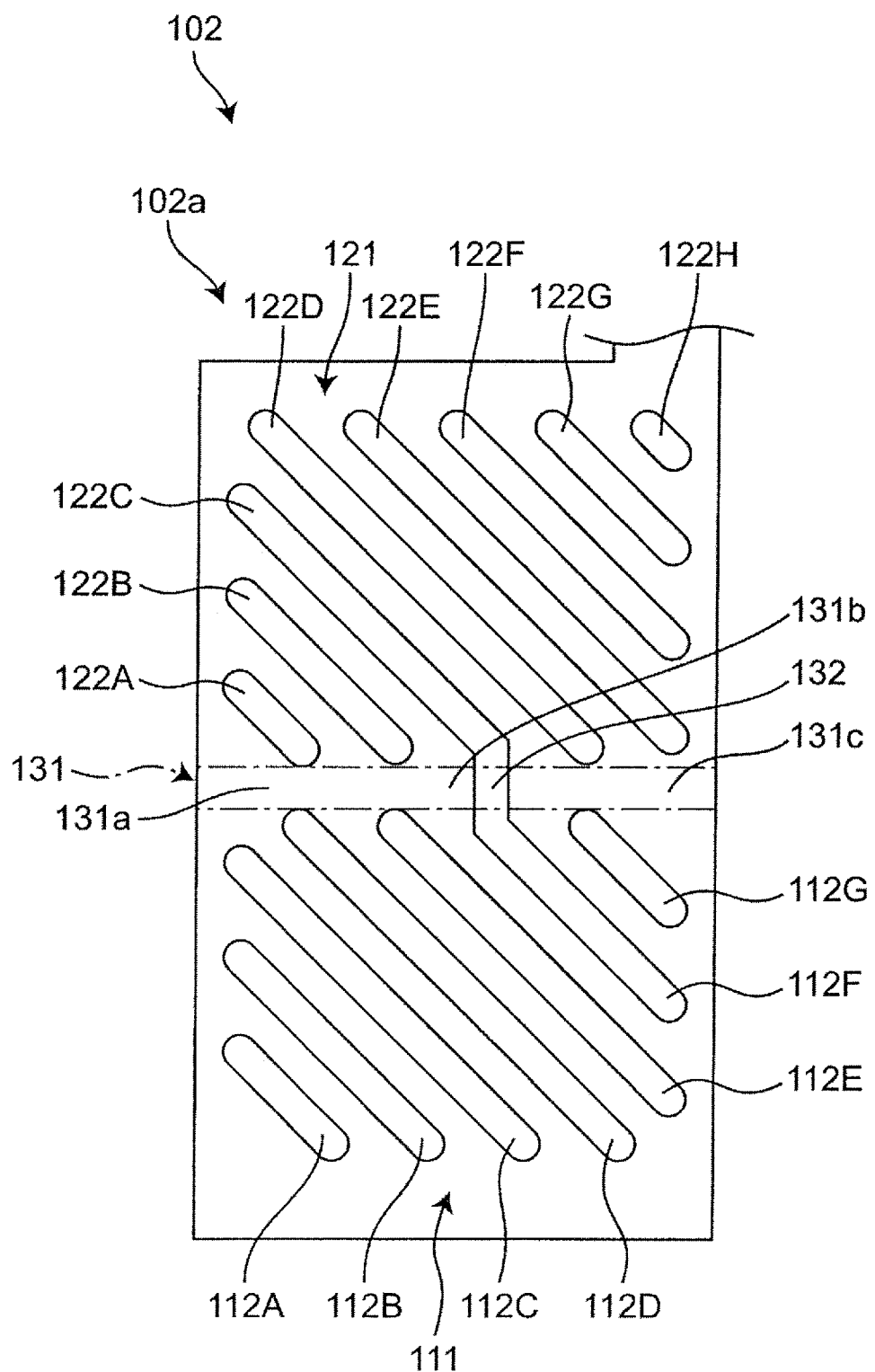
FIG. 5 An enlarged plan view of a first pixel electrode portion of the aforementioned pixel electrode.

FIG. 5 is a plan view showing enlarged the first pixel electrode portion 102a.

The first pixel electrode portion 102a includes: a first slitted region 111 opposed to the domain 101a along the thickness direction (i.e., a direction perpendicular to the plane of the figure of FIG. 5); a second slitted region 121 opposed to the domain 101b along the thickness direction; and a boundary region 131.

In the first slitted region 111, seven slits 112A to 112G extending along a direction parallel to the alignment azimuth of the liquid crystal molecules 41 in the domain 101a are formed. Note that the slits 112A to 112G are examples of first slits.

The slits 112A to 112G are mutually equal in width, while being set to mutually different lengths. The width of the slits 112A to 112G is set to e.g. 3.0 μm. The interval between the slits 112A to 112G is also set to e.g. 3.0 μm. In other words, the design pitch of the slits 112A to 112G may be set to e.g. 6.0 μm. Note that, in terms of improving transmittance of the pixel 101 the design pitch is preferably e.g. 7.0 μm or less, and in terms of facilitating fabrication the design pitch is preferably e.g. 5.2 μm or more.

In the second slitted region 121, eight slits 122A to 122H extending along a direction parallel to the alignment azimuth of the liquid crystal molecules in the domain 101b are formed. Note that the slits 122A to 122H are examples of second slits.

The slits 122A to 122H also are mutually equal in width, while being set to mutually different lengths. The width of the slits 122A to 122H is set to the same width as the width of the slits 112A to 112G. Moreover, the interval between the slits 122A to 122H is also set to the same interval as the interval between the slits 112A to 112G. Note that, in terms of improving transmittance of the pixel 101, the design pitch of the slits 122A to 122H also is e.g. 7.0 μm or less, and in terms of facilitating fabrication the design pitch is preferably e.g. 5.2 μm or more.

The boundary region 131 is provided between the first slitted region 111 and the second slitted region 121. The width of the boundary region 131 (i.e., the length along the up-down direction in FIG. 5) is set to the same width as the width of the slits 112A to 112G or the slits 122A to 122H. Moreover, the boundary region 131 includes a first end portion 131a, a central portion 131b, and a second end portion 131c arranged along the transverse direction of the pixel 101. Assuming that the pixel electrode 102 has a width (i.e., the length along the right-left direction in FIG. 5) L, then the first end portion 131a, the central portion 131b, and the second end portion 131c each have a length of L/3, for example, along their width direction. While no slits are provided in the first and second end portions 131a and 131c, a slit 132 is formed in the central portion 131b. Note that the slit 132 is an example of a third slit.

Regarding the first end portion 131a of the boundary region 131, the ends of the slits 112A to 1120 that are closer to the boundary region 131 are disposed at one side in a direction along the longitudinal direction of the pixel 101. Moreover, regarding the first end portion 131a of the boundary region 131, the end of the slit 122A that is closer to the boundary region 131 is disposed at the other side in the direction along the longitudinal direction of the pixel 101.

Regarding the central portion 131b of the boundary region 131, the ends of the slits 112E, 112F that are closer to the boundary region 131 are disposed at one side in a direction along the longitudinal direction of the pixel 101. Moreover, regarding the central portion 131b of the boundary region 131, the ends of the slits 122B, 122C that are closer to the boundary region 131 are disposed at the other side in the direction along the longitudinal direction of the pixel 101.

Regarding the second end portion 131c of the boundary region 131, the end of the slit 112G that is closer to the boundary region 131 is disposed at one side in a direction along the longitudinal direction of the pixel 101. Moreover, regarding the second end portion 131c of the boundary region 131, the ends of the slits 122D to 122H that are closer to the boundary region 131 are disposed at the other side in the direction along the longitudinal direction of the pixel 101.

The slit 132 is formed so as to be non-parallel to the direction that the slits 112A to 112G extend and non-parallel to the direction that the slits 122A to 122H extend. More specifically, the slit 132 extends along the longitudinal direction of the pixel 101. Moreover, the slit 132 merges with the end of the slit 112F that is closer to the boundary region 131 and merges with the end of the slit 122C that is closer to the boundary region 131, thus connecting the slit 112E and the slit 122B. In other words, the slit 112F and the slit 122C communicate with each other via the slit 132.

Moreover, the ends of the slits 112D to 112G that are closer to the boundary region 131 are mutually aligned in the transverse direction of the pixel 101. Furthermore, the ends of the slits 112D to 112G that are closer to the boundary region 131 are located nearer the boundary region 131 than are the ends of the slits 112A to 112C that are closer to the boundary region 131. Stated in reverse, the ends of the slits 112A to 112C that are closer to the boundary region 131 are located more toward the opposite side from the boundary region 131 than are the ends of the slits 112D to 112G that are closer to the boundary region 131. More specifically, the ends of the slits 112D to 112G that are closer to the boundary region 131 reach the boundary region 131, but the ends of the slits 112A to 112C that are closer to the boundary region 131 do not reach the boundary region 131.

Moreover, the ends of the slits 122A to 122D that are closer to the boundary region 131 are mutually aligned in the transverse direction of the pixel 101. Furthermore, the ends of the slits 122A to 122D that are closer to the boundary region 131 are located nearer the boundary region 131 than are the ends of the slits 122E to 122H that are closer to the boundary region 131. Stated in reverse, the ends of the slits 122E to 122H that are closer to the boundary region 131 are located more toward the opposite side from the boundary region 131 than are the ends of the slits 122A to 122D that are closer to the boundary region 131. More specifically, the ends of the slits 122A to 122D that are closer to the boundary region 131 reach the boundary region 131, but the ends of the slits 122E to 122H that are closer to the boundary region 131 do not reach the boundary region 131.

Moreover, a figure that is presented by the slits 112A to 112G, the slits 122A to 122H, and the slit 132 is not a point-symmetric figure.

Figure 6:
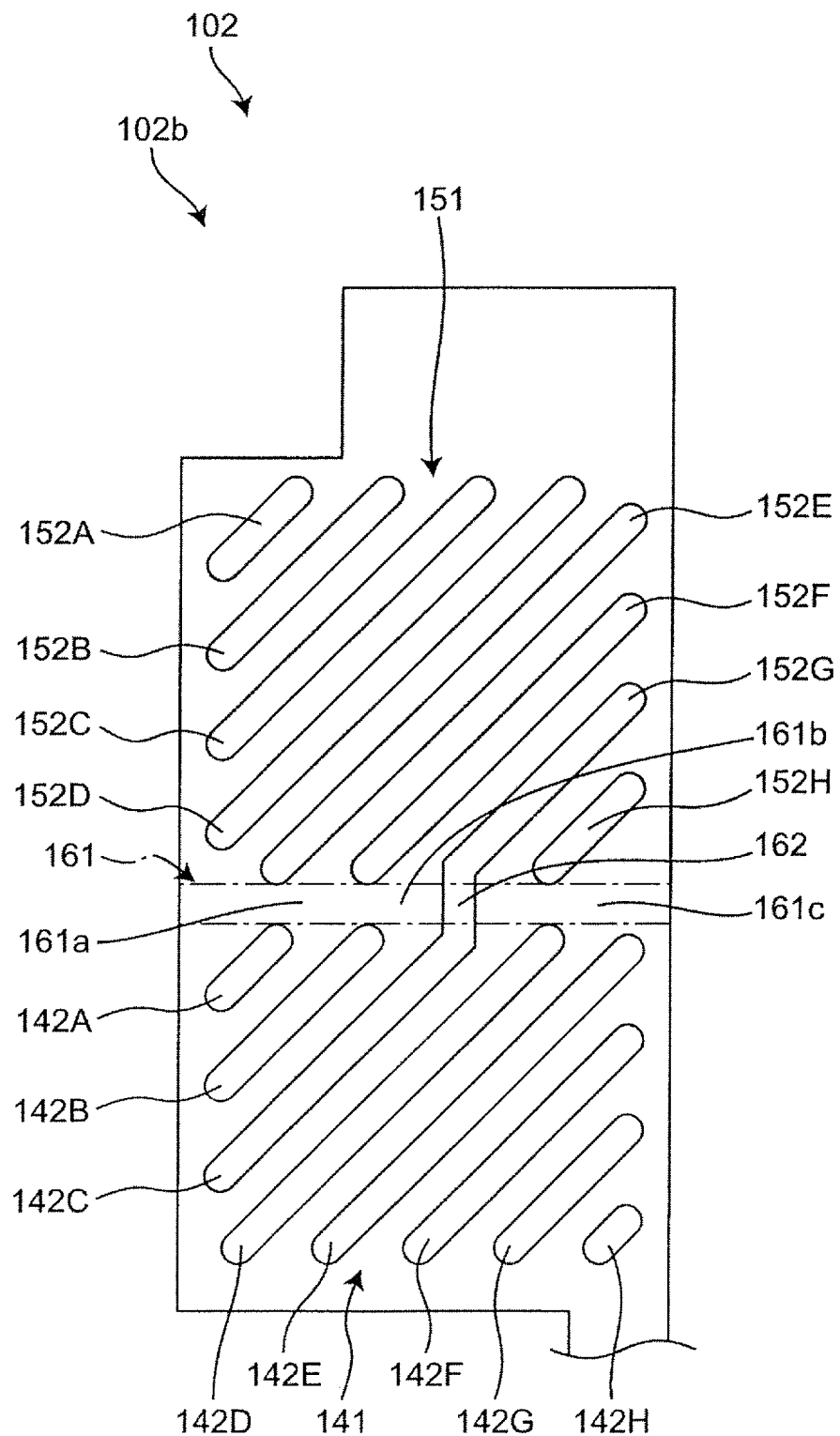
FIG. 6 An enlarged plan view of a second pixel electrode portion of the aforementioned pixel electrode, FIG. 7 A photographic representation of a simulation of dark lines in the first embodiment, FIG. 8 An enlarged plan view of a pixel electrode according to a second embodiment of this invention and its neighborhood.

FIG. 6 is a plan view showing enlarged the second pixel electrode portion 102b.

The second pixel electrode portion 102b includes: a first slitted region 141 opposed to the domain 101c along the thickness direction (i.e., a direction perpendicular to the plane of the figure of FIG. 6); a second slitted region 151 opposed to the domain 101d along the thickness direction; and a boundary region 161.

In the first slitted region 141, eight slits 142A to 142H extending along a direction parallel to the alignment azimuth of the liquid crystal molecules 41 in the domain 101c are formed. Note that the slits 142A to 142H are examples of first slits.

The slits 142A to 142H are mutually equal in width, while being set to mutually different lengths. The width of the slits 142A to 142H is set to e.g. 3.0 μm. Moreover, the interval between the slits 142A to 142H is also set to e g. 3.0 μm. In other words, the design pitch of the slits 142A to 142H is set to e.g. 6.0 μm. Note that, in terms of improving transmittance of the pixel 101 the design pitch is preferably e.g. 7.0 μm or less, and in terms of facilitating fabrication the design pitch is preferably e.g. 5.2 μm or more.

In the second slitted region 151, eight slits 152A to 152H extending along a direction parallel to the alignment azimuth of the liquid crystal molecules in the domain 101d are formed. Note that the slits 152A to 152H are examples of second slits.

The slits 152A to 152H also are mutually equal in width, while being set to mutually different lengths. The width of the slits 152A to 152H is set to the same width as the width of the slits 142A to 142H. Moreover, the interval between the slits 152A to 152H is set to the same interval as the interval between the slits 142A to 142H. Note that, in terms of improving transmittance of the pixel 101, the design pitch of the slits 152A to 152H also is e.g. 7.0 μm or less, and in terms of facilitating fabrication the design pitch is preferably e.g. 5.2 μm or more.

The boundary region 161 is provided between the first slitted region 141 and the second slitted region 151. The width of the boundary region 161 (i.e., the length along the up-down direction in FIG. 6) is set to the same width as the width of the slits 142A to 142H or the slits 152A to 152H. Moreover, the boundary region 161 includes a first end portion 161a, a central portion 161b, and a second end portion 161c arranged along the transverse direction of the pixel 101. Assuming that the pixel electrode 102 has a width (i.e., the length along the right-left direction in FIG. 6) L, then the first end portion 161a, the central portion 161b, and the second end portion 161c each have a length of L/3, for example, along their width direction. While no slits are provided in the first and second end portions 161a and 161c, a slit 162 is formed in the central portion 161b. Note that the slit 162 is an example of a third slit.

Regarding the first end portion 161a of the boundary region 161, the end of the slit 142A that is closer to the boundary region 161 is disposed at one side in a direction along the longitudinal direction of the pixel 101. Moreover, regarding the first end portion 161a of the boundary region 161, the ends of the slits 152A to 152E that are closer to the boundary region 161 are disposed at the other side in the direction along the longitudinal direction of the pixel 101.

Regarding the central portion 161b of the boundary region 161, the ends of the slits 142B, 142C that are closer to the boundary region 161 are disposed at one side in a direction along the longitudinal direction of the pixel 101. Moreover, regarding the central portion 161b of the boundary region 161, the ends of the slits 152F, 152G that are closer to the boundary region 161 are disposed at the other side in the direction along the longitudinal direction of the pixel 101.

Regarding the second end portion 161c of the boundary region 161, the ends of the slits 142D to 142H that are closer to the boundary region 161 are disposed at one side in a direction along the longitudinal direction of the pixel 101. Moreover, regarding the second end portion 161c of the boundary region 161, the end of the slit 152H that is closer to the boundary region 161 is disposed at the other side in the direction along the longitudinal direction of the pixel 101.

The slit 162 is formed so as to be non-parallel to the direction that the slits 142A to 142H extend and non-parallel to the direction that the slits 152A to 152H extend. More specifically, it extends along the longitudinal direction of the pixel electrode 102. Moreover, the slit 162 merges with the end of the slit 142C that is closer to the boundary region 161 and merges with the end of the slit 152G that is closer to the boundary region 161, thus connecting the slit 142C and the slit 152G. In other words, the slit 142C and the slit 152G communicate with each other via the slit 162.

Moreover, the ends of the slits 142A to 142D that are closer to the boundary region 161 are mutually aligned in the transverse direction of the pixel 101. Furthermore, the ends of the slits 142A to 142D that are closer to the boundary region 161 are located nearer the boundary region 161 than are the ends of the slits 142E to 142H that are closer to the boundary region 161. Stated in reverse, the ends of the slits 142E to 142H that are closer to the boundary region 161 are located more toward the opposite side from the boundary region 161 than are the ends of the slits 142A to 142D that are closer to the boundary region 161. More specifically, the ends of the slits 142A to 142D that are closer to the boundary region 161 reach the boundary region 161, but the ends of the slits 142E to 142H that are closer to the boundary region 161 do not reach the boundary region 161.

Moreover, the ends of the slits 152E to 152H that are closer to the boundary region 161 are mutually aligned in the transverse direction of the pixel 101. Furthermore, the ends of the slits 152E to 152H that are closer to the boundary region 161 are located nearer the boundary region 161 than are the ends of the slits 152A to 152D that are closer to the boundary region 161. Stated in reverse, the ends of the slits 152A to 152D that are closer to the boundary region 161 are located more toward the opposite side from the boundary region 161 than are the ends of the slits 152E to 152H that are closer to the boundary region 161. More specifically, the ends of the slits 152E to 152H that are closer to the boundary region 161 reach the boundary region 161, but the ends of the slits 152A to 152D that are closer to the boundary region 161 do not reach the boundary region 161.

Moreover, a figure that is presented by the slits 142A to 142H, the slits 152A to 152H, and the slit 162 is not a point-symmetric figure.

Moreover, as shown in FIG. 4, the slit 132 of the first pixel electrode portion 102*a* and the slit 162 of the second pixel electrode portion 102*b* are mutually aligned in the longitudinal direction of the pixel 101.

With the liquid crystal display panel of the above configuration, when a voltage is applied to the liquid crystal layer 30, a double dark line occurs in a portion above the first pixel electrode portion 102*a* of the pixel 101. At this time, since no slits are formed in the first and second end portions 131*a* and 131*c* of the boundary region 131, but the slit 132 is formed in the central portion 131*b* of the boundary region 131, the liquid crystal molecules 41 above the slit 132 are stabilized by the slit 132. Therefore, a disclination of a double dark line above the first pixel electrode portion 102*a* can be caused to occur above the slit 132.

Moreover, when a voltage is applied to the liquid crystal layer 30, a double dark line also occurs in a portion above the second pixel electrode portion 102*b* of the pixel 101. However, because of not forming any slits in the first and second end portions 161*a* and 161*c* of the boundary region 161 and because of forming the slit 162 in the central portion 161*b* of the boundary region 161, a disclination of a double dark line above the second pixel electrode portion 102*b* can be caused to occur above the slit 162.

Moreover, the slit 132 of the first pixel electrode portion 102*a* and the slit 162 of the second pixel electrode portion 102*b* are mutually aligned in the longitudinal direction of the pixel 101, whereby the location of a disclination of a double dark line above the first pixel electrode portion 102*a* and the location of a disclination of a double dark line above the second pixel electrode portion 102*b* can be mutually aligned in the longitudinal direction of the pixel 101.

Thus, locations of disclinations of double darks line can be controlled, thereby making it possible to improve on coarseness of display and provide an enhanced display quality.

Moreover, since the slit 132 of the first pixel electrode portion 102*a* connects the slit 112F and the slit 122C, the alignment azimuth of the liquid crystal molecules 41 can be stabilized above the slit 132. This promotes the possibility that a disclination of a double dark line occurs above the slit 132.

Moreover, since the slit 162 of the second pixel electrode portion 102*b* connects the slit 142C and the slit 152G, the alignment azimuth of the liquid crystal molecules 41 can be stabilized above the slit 162. This promotes the possibility that a disclination of a double dark line occurs above the slit 162.

Moreover, since the slit 132, 162 extends along the longitudinal direction of the pixel 101, disclinations are stabilized on both sides of the slit 132, 162. This increases the number of disclinations in a double dark line, whereby the width of the double dark line can be reduced. This promotes the effect of preventing a decrease in the light transmittance of the liquid crystal layer 30.

Figure 7:
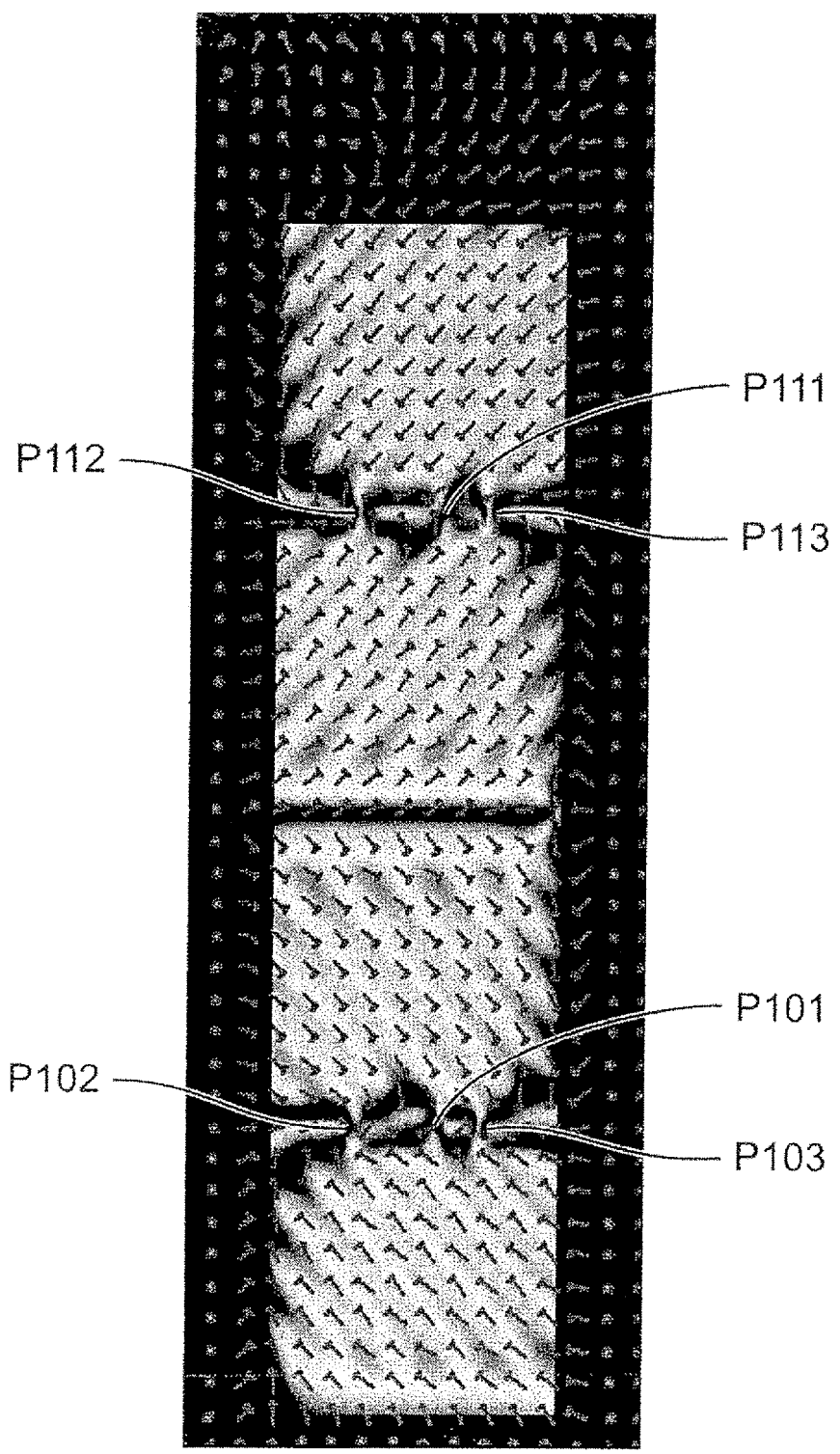

FIG. 7 is a photographic representation of one pixel, showing a result of simulating occurrence of dark lines in the first embodiment. In FIG. 7, liquid crystal molecules 41 under an applied voltage across the liquid crystal layer 30 are depicted as bolt shapes. More specifically, heads of the bolts correspond to bottoms of the cones in FIG. 2 and FIG. 3. On the other hand, ends of the bolts opposite to their heads, i.e., the tips, correspond to apices of the cones in FIG. 2 and FIG. 3.

It can be seen from FIG. 7 that a disclination P101 occurs above the slit 132 of the first pixel electrode portion 102*a*, and a disclination P111 occurs above the slit 162 of the second pixel electrode portion 102*b*, and that the disclination P101 and the disclination Pill are mutually aligned in the longitudinal direction of the pixel 101.

Moreover, disclinations P102 and P103 also occur above the first pixel electrode portion 102*a*, and disclinations P112 and P113 also occur above the second pixel electrode portion 102*b*. However, it can also be seen that the disclinations P102 and P103 are mutually aligned in the longitudinal direction of the pixel 101 with the disclinations P112 and P113.

In the first embodiment, the domains 101*a* to 101*d* are arranged in the order from domains 101*a* to 101*d*. Without being limited to this order, however, they may be arranged in the order of domains 101*b*, 101*a*, 101*d* and 101*c*, for example.

In the first embodiment, the domains 101*a* and 101*b* are provided on the opposite side from the thin film transistor 13 of the pixel electrode 102, while the domains 101*c* and 101*d* are provided on the side closer to the thin film transistor 13 of the pixel electrode 102. Alternatively, the domains 101*a* and 101*b* may be provided on the side closer to the thin film transistor 13 of the pixel electrode 102, while the domains 101*c* and 101*d* may be provided on the opposite side from the thin film transistor 13 of the pixel electrode 102.

In the first embodiment, the pixel 101 includes the domains 101*a* to 101*d*. However, the pixel 101 may be configured so as to include the domains 101*a* and 101*b* but not the domains 101*c* and 101*d*; alternatively, the pixel 101 may be configured so as to include the domains 101*c* and 101*d* but not the domains 101*a* and 101*b*. In other words, a single pixel 101 may only include the domains 101*a* and 101*b* alone, or the domains 101*c* and 101*d* alone.

In the first embodiment, the polarization axis of the first polarizer 60 is parallel to the transverse direction of the pixels 101, and the polarization axis of the second polarizer 70 is parallel to the longitudinal direction of the pixels 101. However, the polarization axis of the first polarizer 60 may be parallel to the longitudinal direction of the pixels 101, while the polarization axis of the second polarizer 70 may be parallel to the transverse direction of the pixels 101.

In the first embodiment, the gate lines 14 are not formed so as to overlap the central portion of the longitudinal direction of the pixel electrode 102; however, they may be formed so as to overlap the central portion of the longitudinal direction of the pixel electrode 102. When adopting this, the direction that the gate lines 14 extend may be parallel to the transverse direction of the pixel 101, or non-parallel to the transverse direction of the pixel 101.

In the first embodiment, the width of the slits 112A to 112G and the interval between the slits 112A to 112G are equal; however, they may be different.

In the first embodiment, the width of the slits 122A to 122H and the interval between the slits 122A to 122H are equal; however, they may be different.

In the first embodiment, assuming that the pixel electrode 102 has a length L along the transverse direction, the first end portion 131a, the central portion 131b, and the second end portion 131c each have a length of L/3 along the transverse direction; however, for example, the first end portion 131a may have L/4, the central portion 131b may have L/2, and the second end portion 131c may have L/4. In other words, given the length L of the pixel electrode 102 along the transverse direction, the central portion 131b may have a length in the range from L/3 to L/2 along the transverse direction.

In the first embodiment, the number of slits formed in the first slitted region 111 is seven, but any plural number other than seven may also be adopted.

In the first embodiment, the number of slits formed in the second slitted region 121, the first slitted region 141, and the second slitted region 151 is eight, but any plural number other than eight may also be adopted.

In the first embodiment, one slit 132 is formed in the central portion 131b of the boundary region 131; alternatively, a plurality of slits similar to the slit 132 may be formed.

In the first embodiment, the slit shapes in the first and second pixel electrode portions 102a and 102b do not constitute a point-symmetric figure. Alternatively, the slit shapes in at least one of the first and second pixel electrode portions 102a and 102b may constitute a point-symmetric figure.

Second Embodiment

Hereinafter, a liquid crystal display panel according to a second embodiment of this invention will be described, where any constituent elements that are identical to constituent element of the first embodiment will be denoted by identical reference numerals to those of the constituent elements in the first embodiment.

Figure 8:
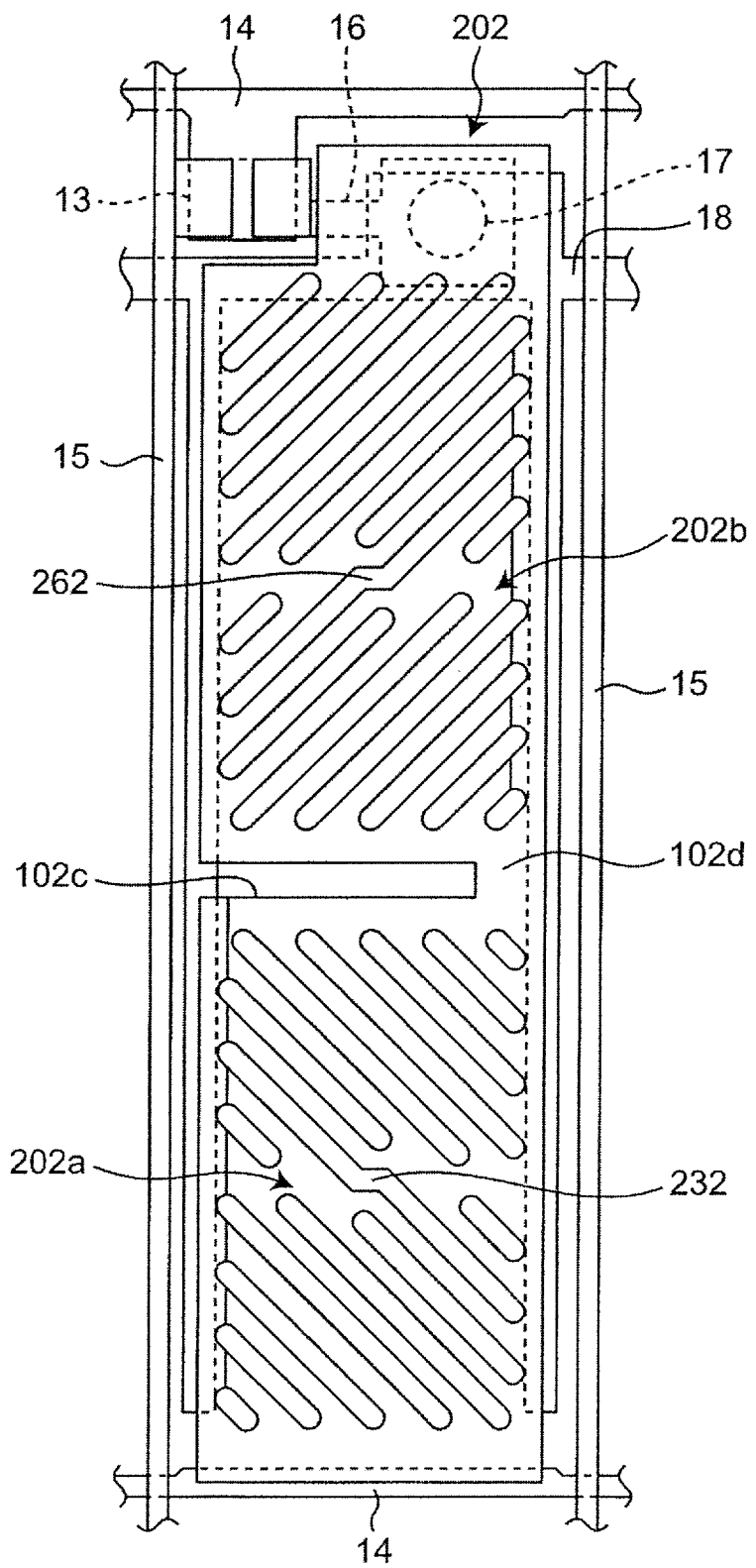

FIG. 8 is a plan view showing enlarged a pixel electrode 202 included in a liquid crystal display panel according to a second embodiment of this invention, and its neighborhood.

The liquid crystal display panel according to the second embodiment differs from the liquid crystal display panel according to the first embodiment in that it includes the pixel electrode 202 instead of the pixel electrode 102. In the liquid crystal display panel according to the second embodiment, any portion other than the pixel electrode 202 is configured similarly to its counterpart in the liquid crystal display panel according to the first embodiment.

The pixel electrode 202 includes: a first pixel electrode portion 202a opposed to domains 101a and 101b along the thickness direction (i.e., a direction perpendicular to the plane of the figure of FIG. 8); and a second pixel electrode portion 202b opposed to domains 101c and 101d along the thickness direction.

Figure 9:
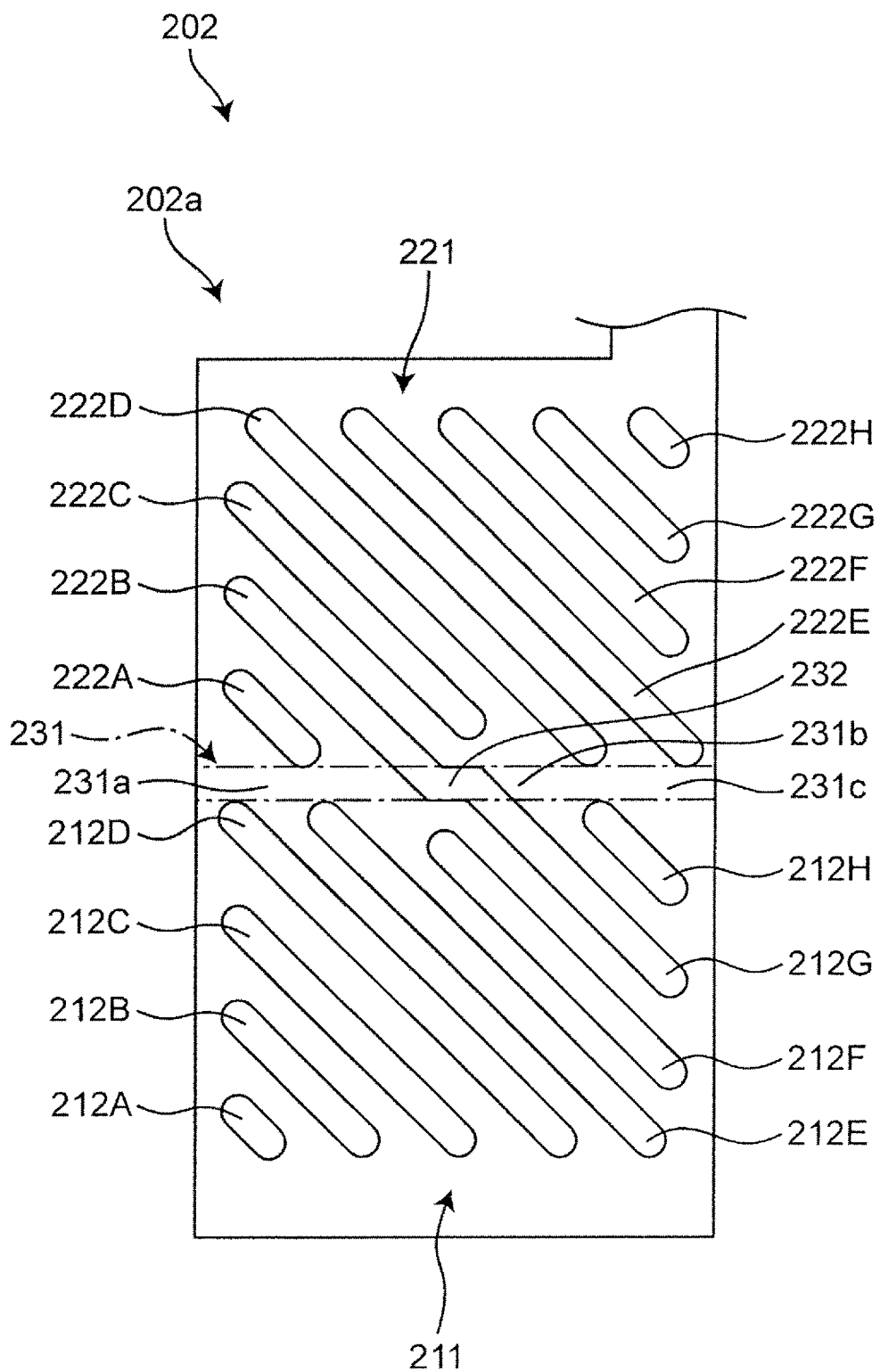
FIG. 9 An enlarged plan view of a first pixel electrode portion of the aforementioned pixel electrode, FIG. 10 An enlarged plan view of a second pixel electrode portion of the aforementioned pixel electrode.

FIG. 9 is a plan view showing enlarged the first pixel electrode portion 202a.

The first pixel electrode portion 202a includes: a first slitted region 211 opposed to the domain 101a along the thickness direction (i.e., a direction perpendicular to the plane of the figure of FIG. 9); a second slitted region 221 opposed to the domain 101b along the thickness direction; and a boundary region 231.

In the first slitted region 211, eight slits 212A to 212H extending along a direction parallel to the alignment azimuth of the liquid crystal molecules 41 in the domain 101a are formed. Note that the slits 212A to 212H are examples of first slits.

The slits 212A to 212H are mutually equal in width, while being set to mutually different lengths. The width of the slits 212A to 212H is set to e.g. 3.0 μm. Moreover, the interval between the slits 212A to 212H is also set toe g. 3.0 μm. In other words, the design pitch of the slits 212A to 212H may be set to e.g. 6.0 μm. Note that, in terms of improving transmittance of the pixel 101 the design pitch is preferably e.g. 7.0 μm or less, and in terms of facilitating fabrication the design pitch is preferably e.g. 5.2 μm or more.

In the second slitted region 221, eight slits 222A to 222H extending along a direction parallel to the alignment azimuth of the liquid crystal molecules 41 in the domain 101b are formed. Note that the slits 222A to 222H are examples of second slits.

The slits 222A to 222H also are mutually equal in width, while being set to mutually different lengths. The width of the slits 222A to 222H is set to the same width as the width of the slits 212A to 212H. Moreover, the interval between the slits 222A to 222H is also set to the same interval as the interval between the slits 212A to 212H. Note that, in terms of improving transmittance of the pixel 101, the design pitch of the slits 222A to 222H also is e.g. 7.0 μm or less, and in terms of facilitating fabrication the design pitch is preferably e.g. 5.2 μm or more.

The boundary region 231 is provided between the first slitted region 211 and the second slitted region 221. The width of the boundary region 231 (i.e., the length along the up-down direction in FIG. 9) is set to the same width as the width of the slits 212A to 212H or the slits 222A to 222H. Moreover, the boundary region 231 includes a first end portion 261a, a central portion 261b, and a second end portion 261c arranged along the transverse direction of the pixel 101. Assuming that the pixel electrode 202 has a width (i.e., the length along the right-left direction in FIG. 9) L, then the first end portion 261a, the central portion 261b, and the second end portion 261c each have a length of L/3, for example, along their width direction. While no slits are provided in the first and second end portions 261a and 261c, a slit 232 is formed in the central portion 261b. Note that the slit 232 is an example of a third slit.

Regarding the first end portion 231a of the boundary region 231, the ends of the slits 212A to 212E that are closer to the boundary region 231 are disposed at one side in a direction along the longitudinal direction of the pixel 101. Moreover, regarding the first end portion 231a of the boundary region 231, the end of the slit 222A that is closer to the boundary region 231 is disposed at the other side in the direction along the longitudinal direction of the pixel 101.

Regarding the central portion 231b of the boundary region 231, the ends of the slits 212F, 212G that are closer to the boundary region 231 are disposed at one side in a direction along the longitudinal direction of the pixel 101. Moreover, regarding the central portion 231b of the boundary region 231, the ends of the slits 222B, 222C that are closer to the boundary region 231 are disposed at the other side in the direction along the longitudinal direction of the pixel 101.

Regarding the second end portion 231c of the boundary region 231, the end of the slit 212H that is closer to the boundary region 231 is disposed at one side in a direction along the longitudinal direction of the pixel 101. Moreover, regarding the second end portion 231c of the boundary region 231, the ends of the slits 222D to 222H that are closer to the boundary region 231 are disposed at the other side in the direction along the longitudinal direction of the pixel 101.

The slit 232 is formed so as to be non-parallel to the direction that the slits 212A to 212H extend and non-parallel to the direction that the slits 222A to 222H extend. More specifically, the slit 232 extends along the transverse direction of the pixel 101. Moreover, the slit 232 merges with the end of the slit 212G that is closer to the boundary region 231 and merges with the end of the slit 222B that is closer to the boundary region 231, thus connecting the slit 212G and the slit 222B. In other words, the slit 212G and the slit 222B communicate with each other via the slit 232.

Moreover, the ends of the slits 212D, 212E, 212G, 212H that are closer to the boundary region 231 are mutually aligned in the transverse direction of the pixel 101. Furthermore, the ends of the slits 212D, 212E, 212G, 212H that are closer to the boundary region 231 are located nearer the boundary region 231 than are the ends of the slits 212A to 212C, 212F that are closer to the boundary region 231. Stated in reverse, the ends of the slits 212A to 212C, 212F that are closer to the boundary region 231 are located more toward the opposite side from the boundary region 231 than are the ends of the slits 212D, 212E, 212G, 212H that are closer to the boundary region 231. More specifically, the ends of the slits 212D, 212E, 212G, 212H that are closer to the boundary region 231 reach the boundary region 231, but the ends of the slits 212A to 212C, 212F that are closer to the boundary region 231 do not reach the boundary region 231.

Moreover, the ends of the slits 222A, 2228, 222D, 222E that are closer to the boundary region 231 are mutually aligned in the transverse direction of the pixel 101. Furthermore, the ends of the slits 222A, 222B, 222D, 222E that are closer to the boundary region 231 are located nearer the boundary region 231 than are the ends of the slits 222C, 222F to 222H that are closer to the boundary region 231. Stated in reverse, the ends of the slits 222C, 222F to 222H that are closer to the boundary region 231 are located more toward the opposite side from the boundary region 231 than are the ends of the slits 222A, 222B, 222D, 222E that are closer to the boundary region 231. More specifically, the ends of the slits 222A, 222B, 222D, 222E that are closer to the boundary region 231 reach the boundary region 231, but the ends of the slits 222C, 222F to 222H that are closer to the boundary region 231 do not reach the boundary region 231.

Moreover, a figure that is presented by the slits 212A to 212H, the slits 222A to 222H, and the slit 232 is a point-symmetric figure. Herein, the center of symmetry overlaps the slit 232.

Figure 10:
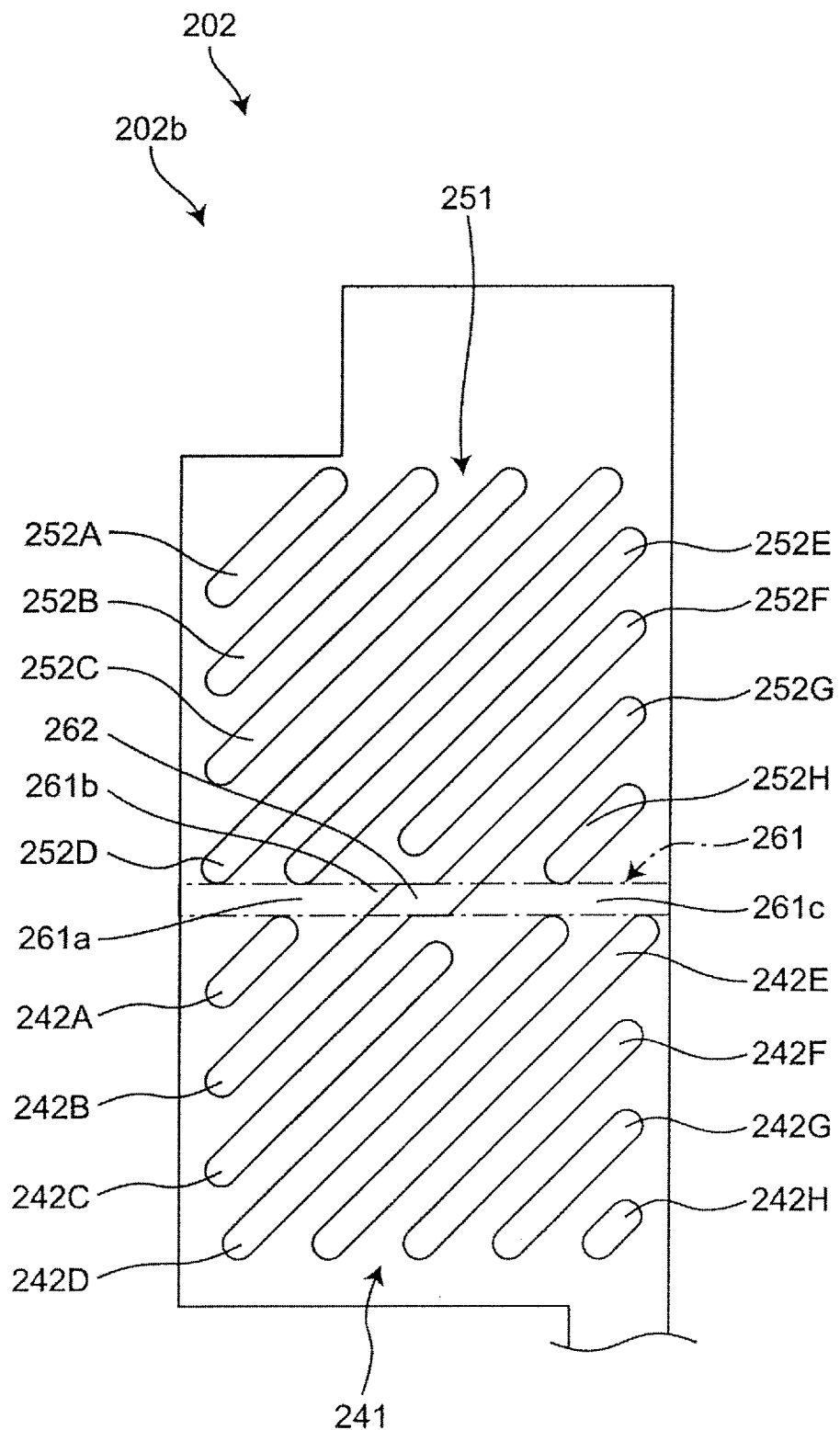

FIG. 10 is a plan view showing enlarged the second pixel electrode portion 202b.

The second pixel electrode portion 202b includes: a first slitted region 241 opposed to the domain 101c along the thickness direction (i.e., a direction perpendicular to the plane of the figure of FIG. 10); a second slitted region 251 opposed to the domain 101d along the thickness direction; and a boundary region 261.

In the first slitted region 241, eight slits 242A to 242H extending along a direction parallel to the alignment azimuth of the liquid crystal molecules 41 in the domain 101c are formed. Note that the slits 242A to 242H are examples of first slits.

The slits 242A to 242H are mutually equal in width, while being set to mutually different lengths. The width of the slits 242A to 242H is set to e.g. 3.0 μm. Moreover, the interval between the slits 242A to 242H is also set to e g. 3.0 μm. In other words, the design pitch of the slits 242A to 242H may be set to e.g. 6.0 μm. Note that, in terms of improving transmittance of the pixel 101 the design pitch is preferably e.g. 7.0 μm or less, and in terms of facilitating fabrication the design pitch is preferably e.g. 5.2 μm or more.

In the second slitted region 251, eight slits 252A to 252H extending along a direction parallel to the alignment azimuth of the liquid crystal molecules 41 in the domain 101d are formed. Note that the slits 252A to 252H are examples of second slits.

The slits 252A, to 252H also are mutually equal in width, while being set to mutually different lengths. The width of the slits 252A, to 252H is set to the same width as the width of the slits 242A to 242H. Moreover, the interval between the slits 252A to 252H is set to the same interval as the interval between the slits 242A to 24211. Note that, in terms of improving transmittance of the pixel 101, the design pitch of the slits 252A to 252H also is e.g. 7.0 μm or less, and in terms of facilitating fabrication the design pitch is preferably e.g. 5.2 μm or more.

The boundary region 261 is provided between the first slitted region 241 and the second slitted region 251. The width of the boundary region 261 (i.e., the length along the up-down direction in FIG. 10) is set to the same width as the width of the slits 242A to 242H or the slits 252A to 252H. Moreover, the boundary region 261 includes a first end portion 261a, a central portion 261b, and a second end portion 261c arranged along the transverse direction of the pixel 101. Assuming that the pixel electrode 202 has a width (i.e., the length along the right-left direction in FIG. 10) L, then the first end portion 261a, the central portion 261b, and the second end portion 261c each have a length of L/3, for example, along their width direction. While no slits are provided in the first and second end portions 261a and 261c, a slit 262 is formed in the central portion 261b. Note that the slit 262 is an example of a third slit.

Regarding the first end portion 261a of the boundary region 261, the end of the slit 242A that is closer to the boundary region 261 is disposed at one side in a direction along the longitudinal direction of the pixel 101. Moreover, regarding the first end portion 261a of the boundary region 261, the ends of the slits 252A to 252E that are closer to the boundary region 261 are disposed at the other side in the direction along the longitudinal direction of the pixel 101.

Regarding the central portion 261b of the boundary region 261, the ends of the slits 242B, 242C that are closer to the boundary region 261 are disposed at one side in a direction along the longitudinal direction of the pixel 101. Moreover, regarding the central portion 261b of the boundary region 261, the ends of the slits 252F, 252G that are closer to the boundary region 261 are disposed at the other side in the direction along the longitudinal direction of the pixel 101.

Regarding the second end portion 261c of the boundary region 261, the ends of the slits 242D to 242H that are closer to the boundary region 261 are disposed at one side in a direction along the longitudinal direction of the pixel 101. Moreover, regarding the second end portion 261c of the boundary region 261, the end of the slit 252H that is closer to the boundary region 261 is disposed at the other side in the direction along the longitudinal direction of the pixel 101.

The slit 262 is formed so as to be non-parallel to the direction that the slits 242A to 242H extend and non-parallel to the direction that the slits 252A to 252H extend. More specifically, the slit 262 extends along the transverse direction of the pixel 101. Moreover, the slit 262 merges with the end of the slit 242B that is closer to the boundary region 261 and merges with the end of the slit 252G that is closer to the boundary region 261, thus connecting the slit 242B and the slit 252G. In other words, the slit 242B and the slit 252G communicate with each other via the slit 262.

Moreover, the ends of the slits 242A, 242B, 242D, 242E that are closer to the boundary region 261 are mutually aligned in the transverse direction of the pixel 101. Furthermore, the slits 242A, 242B, 242D, 242E are located nearer the boundary region 261 than are the ends of the slits 242C, 242F to 242H that are closer to the boundary region 261. Stated in reverse, the ends of the slits 242C, 242F to 242H that are closer to the boundary region 261 are located more toward the opposite side from the boundary region 261 than are the ends of the slits 242A, 242B, 242D, 242E that are closer to the boundary region 261. More specifically, the ends of the slits 242A, 242B, 242D, 242E that are closer to the boundary region 261 reach the boundary region 261, but the ends of the slits 242C, 242F to 242H that are closer to the boundary region 261 do not reach the boundary region 261.

Moreover, the ends of the slits 252D, 252E, 252G, 252H that are closer to the boundary region 261 are mutually aligned in the transverse direction of the pixel 101. Furthermore, the ends of the slits 252D, 252E, 252G, 252H that are closer to the boundary region 261 are located nearer the boundary region 261 than are the ends of the slits 252A to 252C, 252F that are closer to the boundary region 261. Stated in reverse, the ends of the slits 252A to 252C, 252F that are closer to the boundary region 261 are located more toward the opposite side from the boundary region 261 than are the ends of the slits 252D, 252E, 252G, 252H that are closer to the boundary region 261. More specifically, the ends of the slits 252D, 252E, 252G, 252H that are closer to the boundary region 261 reach the boundary region 261, but the ends of the slits 252A to 252C, 252F that are closer to the boundary region 261 do not reach the boundary region 261.

Moreover, a figure that is presented by the slits 242A to 242C, the slits 252F to 252H, and the slit 262 is a point-symmetric figure. Herein, the center of symmetry overlaps the slit 262.

Moreover, as shown in FIG. 8, the slit 232 of the first pixel electrode portion 202a and the slit 262 of the second pixel electrode portion 202b are mutually aligned in the longitudinal direction of the pixel 101.

With the liquid crystal display panel of the above configuration, no slits are formed in the first end portions 231a and 261a of the boundary regions 231 and 261 and in the second end portions 231c and 261c of the boundary regions 231 and 261, but the slits 232, 262 are formed in the central portions 231b and 261b of the boundary regions 231 and 261, whereby similar actions and effects as those in the first embodiment are obtained.

Moreover, the slits 232, 262 extend along the transverse direction of the pixel 101, whereby disorder in the shape of a double dark line ascribable to the domain 101a and the domain 101b can be prevented and disorder in the shape of a double dark line ascribable to the domain 101c and the domain 101d can be prevented.

Moreover, a figure that is presented by the slits 212A to 212H, the slits 222A to 222H, and the slit 232 is a point-symmetric figure, whereby disorder in the shape of a double dark line ascribable to the domain 101a and the domain 101b can be prevented.

Moreover, a figure that is presented by the slits 242A to 242C, the slits 252F to 252H, and the slit 262 is a point-symmetric figure, whereby disorder in the shape of a double dark line ascribable to the domain 101c and the domain 101d can be prevented.

Moreover, the end of the slit 212F that is closer to the boundary region 231 is located more toward the opposite side from the boundary region 231 than are the ends of the slits 212D, 212E, 212G, 212H that are closer to the boundary region 231. Moreover, the end of the slit 222C that is closer to the boundary region 231 is located more toward the opposite side from the boundary region 231 than are the ends of the slits 222A, 222B, 222D, 222E that are closer to the boundary region 231. This can restrain the slits 212F, 222C from becoming connected with the slit 232 due to manufacturing variation.

Moreover, the end of the slit 242C that is closer to the boundary region 261 is located more toward the opposite side from the boundary region 261 than are the ends of the slits 242A, 242B, 242D, 242E that are closer to the boundary region 261. Moreover, the end of the slit 252F that is closer to the boundary region 261 is located more toward the opposite side from the boundary region 261 than are the ends of the slits 252D, 252E, 252G, 252H that are closer to the boundary region 261. This can restrain the slits 212F, 222C from becoming connected with the slit 232 due to manufacturing variation.

Figure 11:
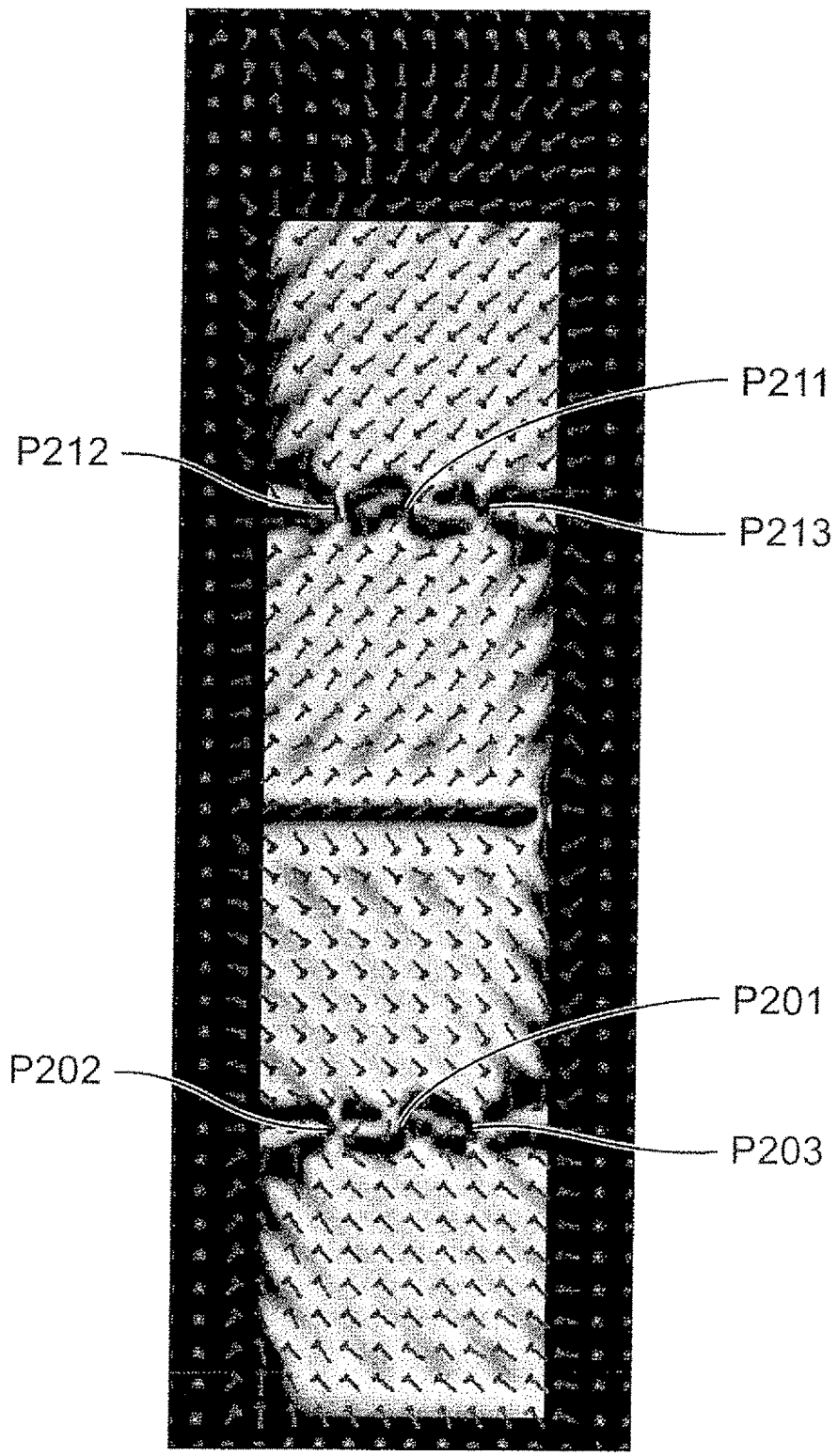
FIG. 11 A photographic representation of a simulation of dark lines in the second embodiment.

FIG. 11 is a photographic representation of one pixel, showing a result of simulating occurrence of dark lines in the second embodiment. In FIG. 11, liquid crystal molecules 41 under an applied voltage across the liquid crystal layer 30 are depicted as bolt shapes, as in FIG. 7.

It can be seen from FIG. 11 that a disclination P201 occurs above the slit 232 of the first pixel electrode portion 202a, and a disclination P211 occurs above the slit 262 of the second pixel electrode portion 202b, and that the disclination P201 and the disclination P211 are mutually aligned in the longitudinal direction of the pixel 101.

Moreover, disclinations P202 and P203 also occur above the first pixel electrode portion 202a, and disclinations P212 and P213 also occur above the second pixel electrode portion 202b. However, it can also be seen that the disclinations P202 and P203 and the disclinations P212 and P213 are mutually aligned in the longitudinal direction of the pixel 101.

In the second embodiment, a figure that is presented by all of the slits 212A to 212H, 222A to 222H is a point-symmetric figure. Alternatively, a figure that is presented by only the ends of the slits 212A to 212H, 222A to 222H that are closer to the boundary region 231 and by the slit 232 may be a point-symmetric figure.

In the second embodiment, a figure that is presented by all of the slits 242A to 242C, 252F to 252H is a point-symmetric figure. Alternatively, a figure that is presented by only the ends of the slits 242A to 242C, 252F to 252H that are closer to the boundary region 261 and by the slit 262 may be a point-symmetric figure.

In the second embodiment, a figure that is presented by the slits 242A to 242C, 252F to 252H is a point-symmetric figure. Alternatively, a figure that is presented by the slits 242A to 242H, 252A to 252H may be a point-symmetric figure.

Third Embodiment

Hereinafter, a liquid crystal display panel according to a third embodiment of this invention will be described, where any constituent elements that are identical to constituent element of the first embodiment will be denoted by identical reference numerals to those of the constituent elements in the first embodiment.

Figure 12:
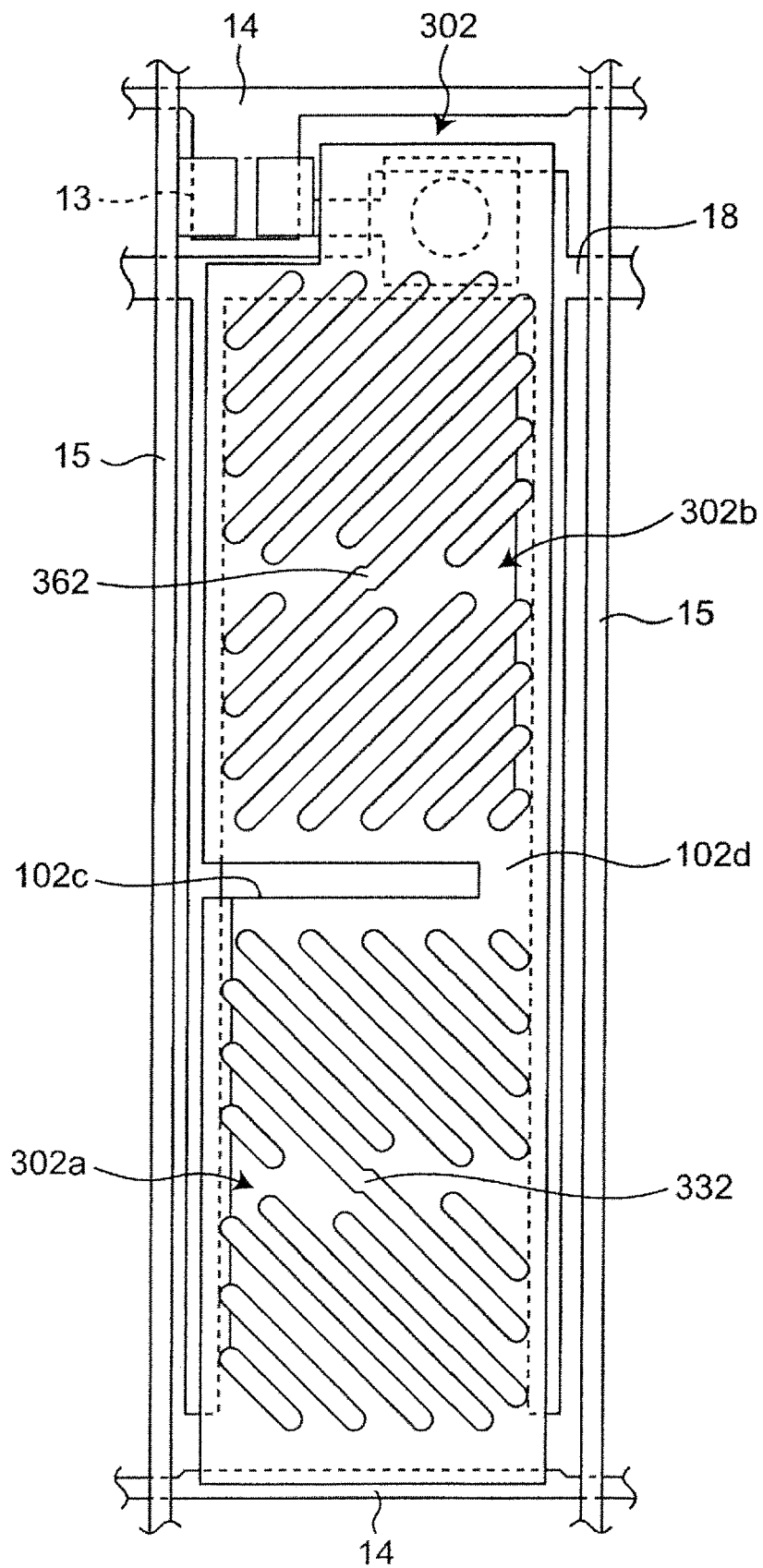
FIG. 12 An enlarged plan view of a pixel electrode according to a third embodiment of this invention and its neighborhood.

FIG. 12 is a plan view showing enlarged a pixel electrode 302 included in a liquid crystal display panel according to a third embodiment of this invention, and its neighborhood.

The liquid crystal display panel according to the third embodiment differs from the liquid crystal display panel according to the first embodiment in that it includes the pixel electrode 302 instead of the pixel electrode 102. In the liquid crystal display panel according to the third embodiment, any portion other than the pixel electrode 302 is configured similarly to its counterpart in the liquid crystal display panel according to the first embodiment.

The pixel electrode 302 includes: a first pixel electrode portion 302a opposed to domains 101a and 101b along the thickness direction (i.e., a direction perpendicular to the plane of the figure of FIG. 12); and a second pixel electrode portion 302b opposed to domains 101c and 101d along the thickness direction.

Figure 13:
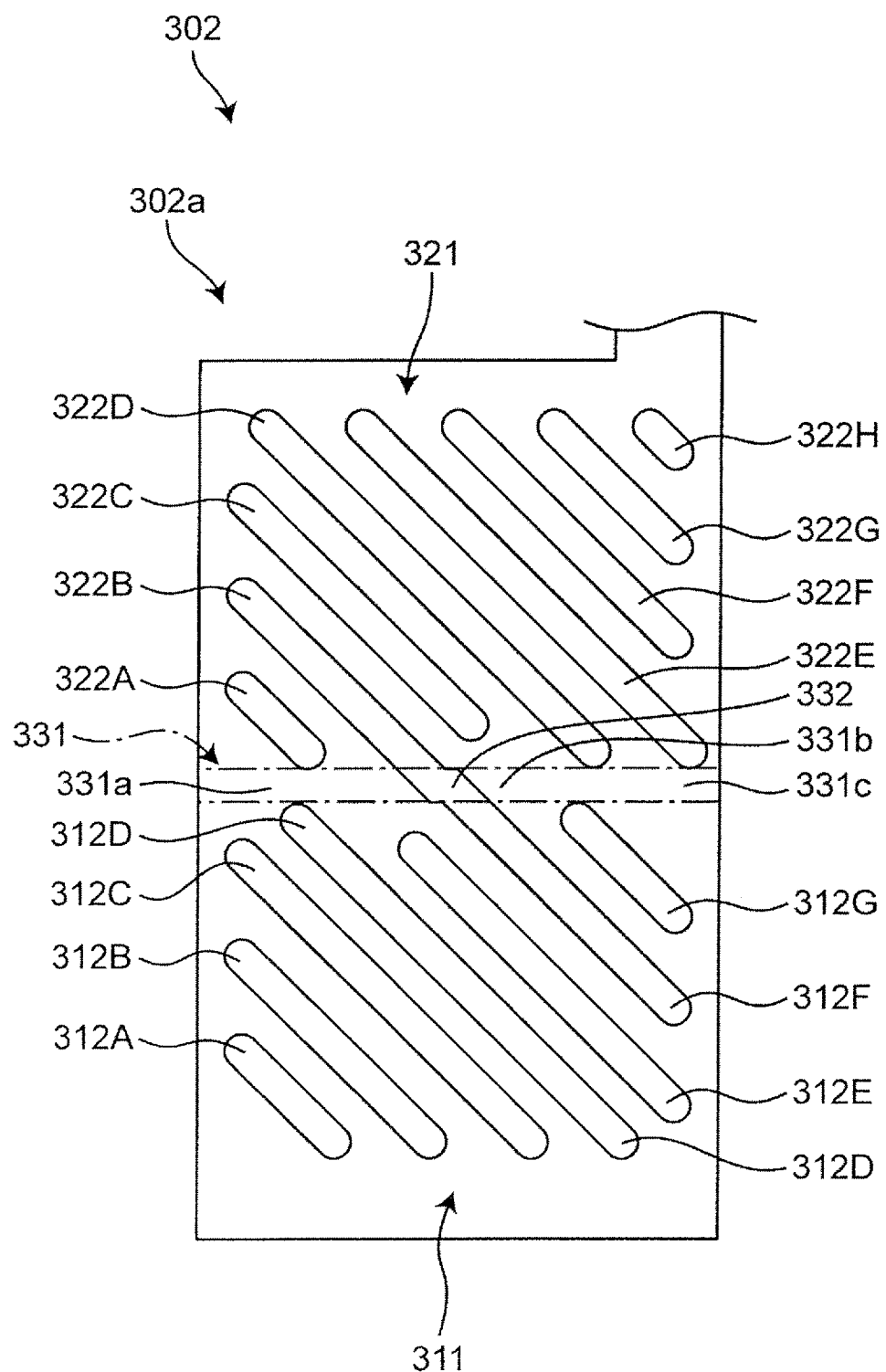
FIG. 13 An enlarged plan view of a first pixel electrode portion of the aforementioned pixel electrode.

FIG. 13 is a plan view showing enlarged the first pixel electrode portion 302a.

The first pixel electrode portion 302a includes: a first slitted region 311 opposed to the domain 101a along the thickness direction (i.e., a direction perpendicular to the plane of the figure of FIG. 13); a second slitted region 321 opposed to the domain 101b along the thickness direction; and a boundary region 331.

In the first slitted region 311, seven slits 312A to 312G extending along a direction parallel to the alignment azimuth of the liquid crystal molecules 41 in the domain 101a are formed. Note that the slits 312A to 312G are examples of first slits.

The slits 312A to 312G are mutually equal in width, while being set to mutually different lengths. The width of the slits 312A to 312G is set to e.g. 3.0 μm. The interval between the slits 312A to 312G is also set to e.g. 3.0 μm. In other words, the design pitch of the slits 312A to 312G may be set to e.g. 6.0 μm. Note that, in terms of improving transmittance of the pixel 101 the design pitch is preferably e.g. 7.0 μm or less, and in terms of facilitating fabrication the design pitch is preferably e.g. 5.2 μm or more.

In the second slitted region 321, eight slits 322A to 322H extending along a direction parallel to the alignment azimuth of the liquid crystal molecules 41 in the domain 101b are formed. Note that the slits 322A to 322H are examples of second slits.

The slits 322A to 322H also are mutually equal in width, while being set to mutually different lengths. The width of the slits 322A to 322H is set to the same width as the width of the slits 312A to 312G. Moreover, the interval between the slits 322A to 322H is also set to the same interval as the interval between the slits 312A to 312G. Note that, in terms of improving transmittance of the pixel 101, the design pitch of the slits 322A to 322H also is e.g. 7.0 μm or less, and in terms of facilitating fabrication the design pitch is preferably e.g. 5.2 μm or more.

The boundary region 331 is provided between the first slitted region 311 and the second slitted region 321. The width of the boundary region 331 (i.e., the length along the up-down direction in FIG. 13) is set to the same width as the width of the slits 312A to 312G or the slits 322A to 322H. Moreover, the boundary region 331 includes a first end portion 331a, a central portion 331b, and a second end portion 331c arranged along the transverse direction of the pixel 101. Assuming that the pixel electrode 302 has a width (i.e., the length along the right-left direction in FIG. 13) L, then the first end portion 331a, the central portion 331b, and the second end portion 331c each have a length of L/3, for example, along their width direction. While no slits are provided in the first and second end portions 331a and 331c, a slit 332 is formed in the central portion 331b. Note that the slit 332 is an example of a third slit.

Regarding the first end portion 331a of the boundary region 331, the ends of the slits 312A to 312D that are closer to the boundary region 331 are disposed at one side in a direction along the longitudinal direction of the pixel 101. Moreover, regarding the first end portion 331a of the boundary region 331, the end of the slit 322A that is closer to the boundary region 331 is disposed at the other side in the direction along the longitudinal direction of the pixel 101.

Regarding the central portion 331b of the boundary region 331, the ends of the slits 312E, 312F that are closer to the boundary region 331 are disposed at one side in a direction along the longitudinal direction of the pixel 101. Moreover, regarding the central portion 331b of the boundary region 331, the ends of the slits 322B, 322C that are closer to the boundary region 331 are disposed at the other side in the direction along the longitudinal direction of the pixel 101.

Regarding second end portion 331c of the boundary region 331, the end of the slit 312G that is closer to the boundary region 331 is disposed at one side in a direction along the longitudinal direction of the pixel 101. Moreover, regarding the second end portion 331c of the boundary region 331, the ends of the slits 322D to 322H that are closer to the boundary region 331 are disposed at the other side in the direction along the longitudinal direction of the pixel 101.

The slit 332 is composed of a portion that is on the same line as the slit 312F and a portion that is on the same line as the slit 322B, so as to have a smaller aperture area than that of the slit 232 according to the second embodiment. Moreover, the slit 332 merges with the end of the slit 312F that is closer to the boundary region 331 and merges with the end of the slit 322B that is closer to the boundary region 331, thus connecting the slit 312F and the slit 322B. In other words, the slit 312F and the slit 322B communicate with each other via the slit 332.

Moreover, the ends of the slits 312D, 312F, 312G that are closer to the boundary region 331 are mutually aligned in the transverse direction of the pixel 101. Moreover, the ends of the slits 312C, 312E that are closer to the boundary region 331 also are mutually aligned in the transverse direction of the pixel 101. Furthermore, the ends of the slits 312D, 312F, 312G that are closer to the boundary region 331 are located nearer the boundary region 331 than are the ends of the slits 312A to 312C, 312E that are closer to the boundary region 331. Stated in reverse, the ends of the slits 312A to 312C, 312E that are closer to the boundary region 331 are located more toward the opposite side from the boundary region 331 than are the ends of the slits 312D, 312F, 312G that are closer to the boundary region 331. More specifically, the ends of the slits 312D, 312F, 312G that are closer to the boundary region 331 reach the boundary region 331, but the ends of the slits 312A to 312C, 312E that are closer to the boundary region 331 do not reach the boundary region 331.

Moreover, the ends of the slits 322A, 322B, 322D, 322E that are closer to the boundary region 331 are mutually aligned in the transverse direction of the pixel 101. Furthermore, the ends of the slits 322A, 322B, 322D, 322E that are closer to the boundary region 331 are located nearer the boundary region 331 than are the ends of the slits 322C, 322F to 322H that are closer to the boundary region 331. Stated in reverse, the ends of the slits 322C, 322F to 322H that are closer to the boundary region 331 are located more toward the opposite side from the boundary region 331 than are the ends of the slits 322A, 322B, 322D, 322E that are closer to the boundary region 331. More specifically, the ends of the slits 322A, 322B, 322D, 322E that are closer to the boundary region 331 reach the boundary region 331, but the ends of the slits 322C, 322F to 322H that are closer to the boundary region 331 do not reach the boundary region 331.

Moreover, a figure that is presented by the slits 312A to 312G, the slits 322A to 322H, and the slit 332 is not a point-symmetric figure.

Figure 14:
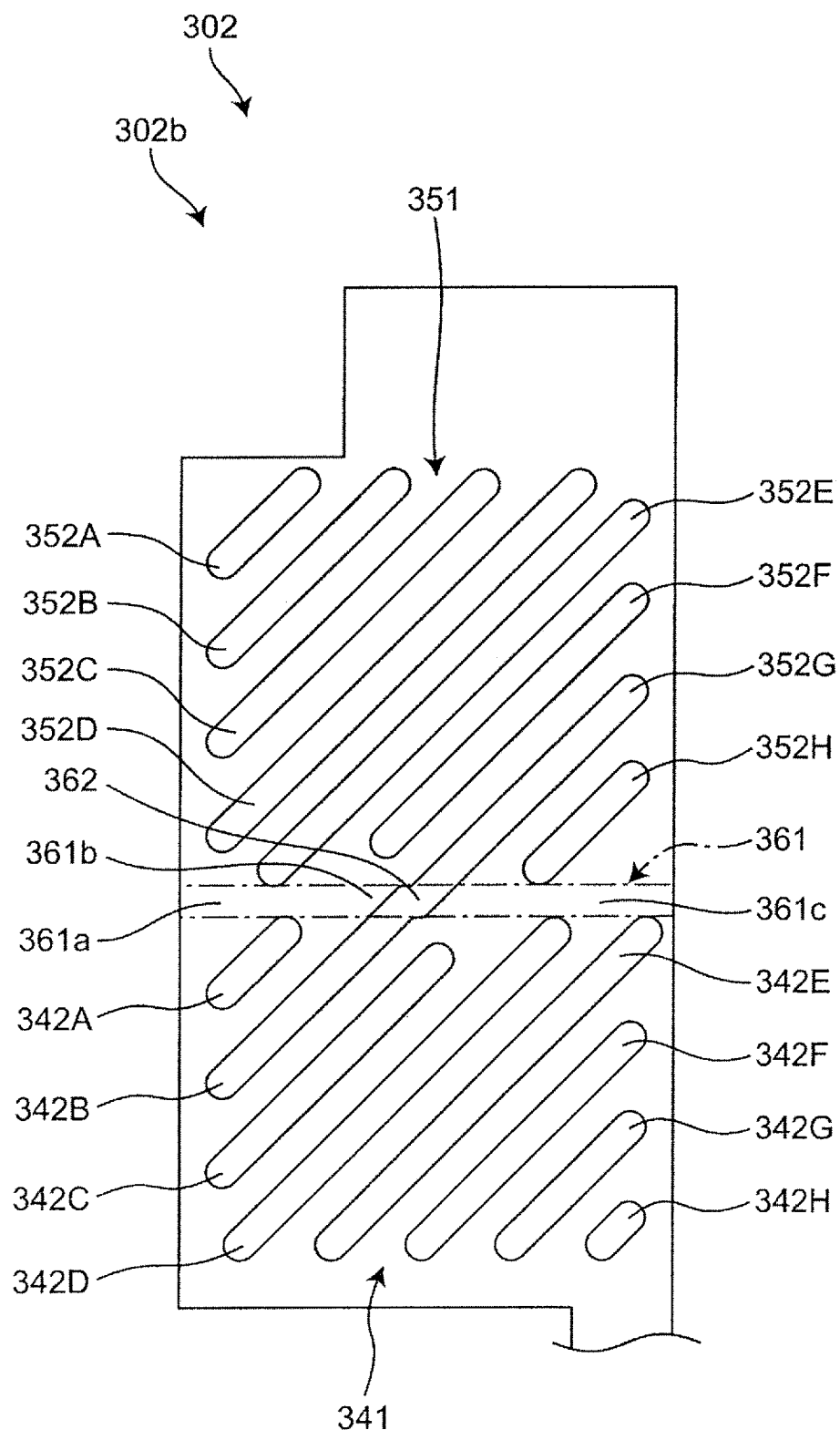
FIG. 14 An enlarged plan view of a second pixel electrode portion of the aforementioned pixel electrode, FIG. 15 A photographic representation of a simulation of dark lines in the third embodiment.

FIG. 14 is a plan view showing enlarged the second pixel electrode portion 302b.

The second pixel electrode portion 302b includes: a first slitted region 341 opposed to the domain 101c along the thickness direction (i.e., a direction perpendicular to the plane of the figure of FIG. 14); a second slitted region 351 opposed to the domain 101d along the thickness direction; and a boundary region 361.

In the first slitted region 341, eight slits 342A to 342H extending along a direction parallel to the alignment azimuth of the liquid crystal molecules 41 in the domain 101c are formed. Note that the slits 342A to 342H are examples of first slits.

The slits 342A to 342H are mutually equal in width, while being set to mutually different lengths. The width of the slits 342A to 342H is set to e.g. 3.0 µm. The interval between the slits 342A to 342H is also set to e.g. 3.0 µm. In other words, the design pitch of the slits 342A to 342H may be set to e.g. 6.0 µm. Note that, in terms of improving transmittance of the pixel 101 the design pitch is preferably e.g. 7.0 µm or less, and in terms of facilitating fabrication the design pitch is preferably e.g. 5.2 µm or more.

In the second slitted region 351, eight slits 352A to 352H extending along a direction parallel to the alignment azimuth of the liquid crystal molecules 41 in the domain 101d are formed. Note that the slits 352A to 352H are examples of second slits.

The slits 352A to 352H also are mutually equal in width, while being set to mutually different lengths. The width of the slits 352A to 352H is set to the same width as the width of the slits 342A to 342H. Moreover, the interval between the slits 352A, to 352H is set to the same interval as the interval between the slits 342A to 342H. Note that, in terms of improving transmittance of the pixel 101, the design pitch of the slits 352A to 352H also is e.g. 7.0 µm or less, and in terms of facilitating fabrication the design pitch is preferably e.g. 5.2 µm or more.

The boundary region 361 is provided between the first slitted region 341 and the second slitted region 351. The width of the boundary region 361 (i.e., the length along the up-down direction in FIG. 14) is set to the same width as the width of the slits 342A to 342H or the slits 352A to 352H. Moreover, the boundary region 361 includes a first end portion 361a, a central portion 361b, and a second end portion 361c arranged along the transverse direction of the pixel 101. Assuming that the pixel electrode 302 has a width (i.e., the length along the right-left direction in FIG. 14) L, then the first end portion 361a, the central portion 361b, and the second end portion 361c each have a length of L/3, for example, along their width direction. While no slits are provided in the first and second end portions 361a and 361c, a slit 362 is formed in the central portion 361b. Note that the slit 362 is an example of a third slit.

Regarding the first end portion 361a of the boundary region 361, the end of the slit 342A that is closer to the boundary region 361 is disposed at one side in a direction along the longitudinal direction of the pixel 101. Moreover, regarding the first end portion 361a of the boundary region 361, the ends of the slits 352A to 352E that are closer to the boundary region 361 are disposed at the other side in the direction along the longitudinal direction of the pixel 101.

Regarding the central portion 361b of the boundary region 361, the ends of the slits 342B, 342C that are closer to the boundary region 361 are disposed at one side in a direction along the longitudinal direction of the pixel 101. Moreover, regarding the central portion 361b of the boundary region 361, the ends of the slits 352F, 352G that are closer to the boundary region 361 are disposed at the other side in the direction along the longitudinal direction of the pixel 101.

Regarding the second end portion 361c of the boundary region 361, the ends of the slits 342D to 342H that are closer to the boundary region 361 are disposed at one side in a direction along the longitudinal direction of the pixel 101. Moreover, regarding the second end portion 361c of the boundary region 361, the end of the slit 352H that is closer to the boundary region 361 is disposed at the other side in the direction along the longitudinal direction of the pixel 101.

The slit 362 is composed of a portion that is on the same line as the slit 342B and a portion that is on the same line as the slit 352G, so as to have a smaller aperture area than that of the slit 262 according to the second embodiment. Moreover, the slit 362 merges with the end of the slit 342B that is closer to the boundary region 361 and merges with the end of the slit 352G that is closer to the boundary region 361, thus connecting the slit 342B and the slit 352G. In other words, the slit 342B and the slit 352G communicate with each other via the slit 362.

Moreover, the ends of the slits 342A, 342B, 342D, 342E that are closer to the boundary region 361 are mutually aligned in the transverse direction of the pixel 101. Furthermore, the ends of the slits 342A, 342B, 342D, 342E that are closer to the boundary region 361 are located nearer the boundary region 361 than are the ends of the slits 342C, 342F to 342H that are closer to the boundary region 361. Stated in reverse, the ends of the slits 342C, 342F to 342H that are closer to the boundary region 361 are located more toward the opposite side from the boundary region 361 than are the ends of the slits 342A, 342B, 342D, 342E that are closer to the boundary region 361. More specifically, the ends of the slits 342A, 342B, 342D, 342E that are closer to the boundary region 361 reach the boundary region 361, but the ends of the slits 342C, 342F to 342H that are closer to the boundary region 361 do not reach the boundary region 361.

Moreover, the ends of the slits 352E, 352G, 352H that are closer to the boundary region 361 are mutually aligned in the transverse direction of the pixel 101. Moreover, the ends of the slits 352D, 352F that are closer to the boundary region 361 also are mutually aligned in the transverse direction of the pixel 101. Furthermore, the ends of the slits 352E, 352G, 352H that are closer to the boundary region 361 are located nearer the boundary region 361 than are the ends of the slits 352A to 352D, 352F that are closer to the boundary region 361. Stated in reverse, the ends of the slits 352A to 352D, 352F that are closer to the boundary region 361 are located more toward the opposite side from the boundary region 361 than are the ends of the slits 352E, 352G, 352H that are closer to the boundary region 361. More specifically, the ends of the slits 352E, 352G, 352H that are closer to the boundary region 361 reach the boundary region 361, but the ends of the slits 352A to 352D, 352F that are closer to the boundary region 361 do not reach the boundary region 361.

Moreover, a figure that is presented by the slits 342A to 342H, the slits 352A to 352H, and the slit 362 is not a point-symmetric figure.

Moreover, as shown in FIG. 12, the slit 332 of the first pixel electrode portion 302a and the slit 362 of the second pixel electrode portion 302b are mutually aligned in the longitudinal direction of the pixel 101.

With the liquid crystal display panel of the above configuration, no slits are formed in the first end portions 331a and 361a of the boundary regions 331 and 361 and in the second end portions 331c and 361c of the boundary regions 331 and 361, but the slits 332, 362 are formed in the central portions 331b and 361b of the boundary regions 331 and 361. Slit shapes in the first and second pixel electrode portions 302a and 302b herein are different from those in the second embodiment, so that the lengths of the slits 332, 362 along the transverse direction of the pixel 101 are shorter than in the second embodiment; however, similar actions and effects as those in the first embodiment are obtained.

Moreover, the slits 332, 362 have smaller aperture areas than those of the slits 232, 262 of the second embodiment, whereby the light transmittance of the liquid crystal layer 30 can be increased from that in the second embodiment.

Moreover, the end of the slit 312E that is closer to the boundary region 331 is located more toward the opposite side from the boundary region 331 than are the ends of the slits 312D, 312F, 312G that are closer to the boundary region 331. Moreover, the end of the slit 322C that is closer to the boundary region 331 is located more toward the opposite side from the boundary region 331 than are the ends of the slits 322A, 322B, 322D, 322E that are closer to the boundary region 331. This can restrain the slits 312E, 322C from becoming connected with the slit 332 due to manufacturing variation.

Moreover, the end of the slit 342C that is closer to the boundary region 361 is located more toward the opposite side from the boundary region 361 than are the ends of the slits 342A, 342B, 342D, 342E that are closer to the boundary region 361. Moreover, the end of the slit 352F that is closer to the boundary region 361 is located more toward the opposite side from the boundary region 361 than are the ends of the slits 352E, 352G, 352H that are closer to the boundary region 361. This can restrain the slits 342C, 352F from becoming connected with the slit 362 due to manufacturing variation.

Figure 15:
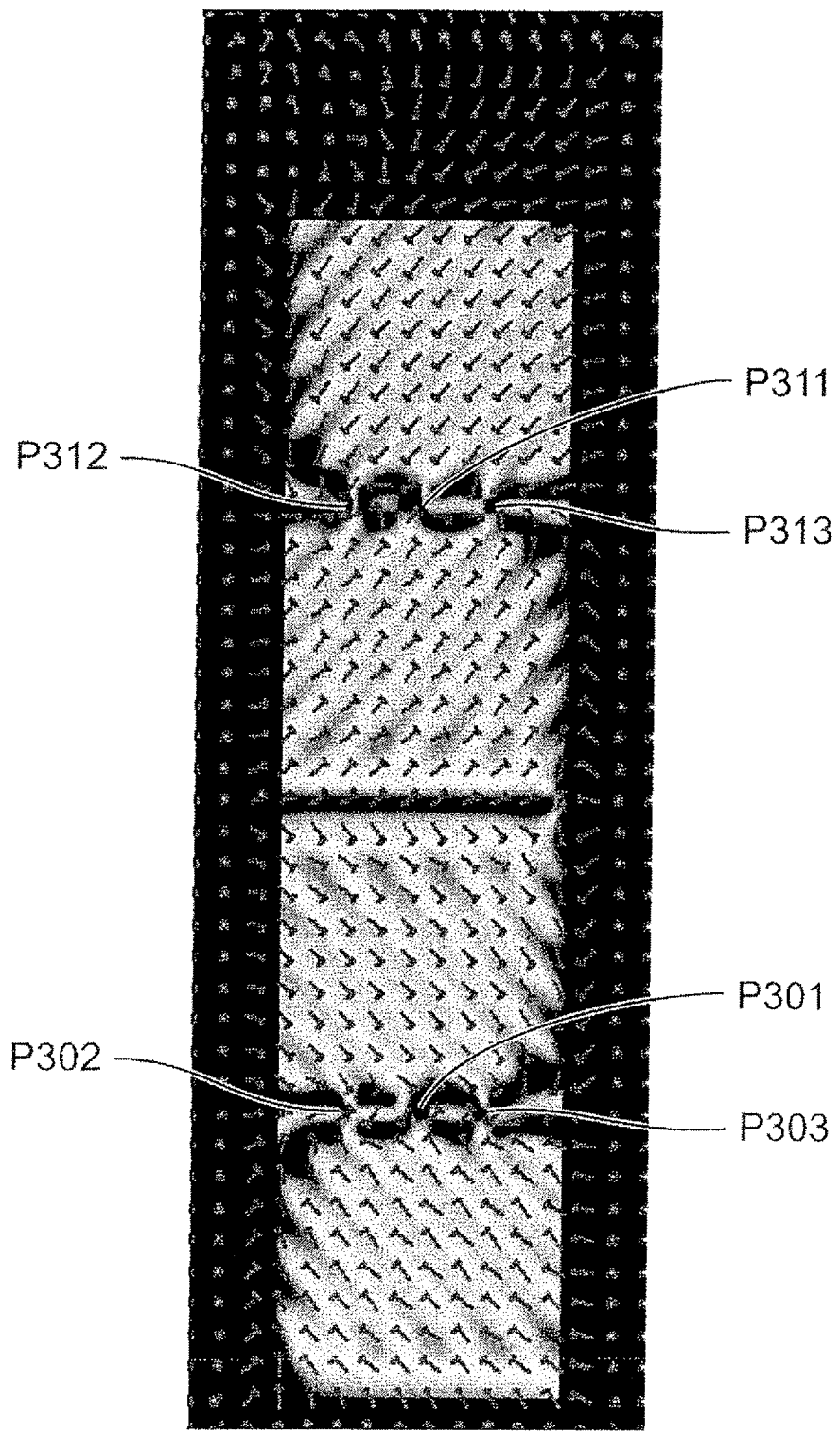

FIG. 15 is a photographic representation of one pixel, showing a result of simulating occurrence of dark lines in the third embodiment. In FIG. 15, liquid crystal molecules 41 under an applied voltage across the liquid crystal layer 30 are depicted as bolt shapes, as in FIG. 7.

It can be seen from FIG. 15 that a disclination P301 occurs above the slit 332 of the first pixel electrode portion 302a, and a disclination P311 occurs above the slit 362 of the second pixel electrode portion 302b, and that the disclination P301 and the disclination P311 are mutually aligned in the longitudinal direction of the pixel 101.

Moreover, disclinations P302 and P303 also occur above the first pixel electrode portion 302a, and disclinations P312 and P313 also occur above the second pixel electrode portion 302b. However, it can also be seen that the disclinations P302 and P303 and the disclinations P312 and P313 are mutually aligned in the longitudinal direction of the pixel 101.

Fourth Embodiment

Hereinafter, a liquid crystal display panel according to a fourth embodiment of this invention will be described, where any constituent elements that are identical to constituent elements of the first embodiment will be denoted by identical reference numerals to those of the constituent elements in the first embodiment.

Figure 16:
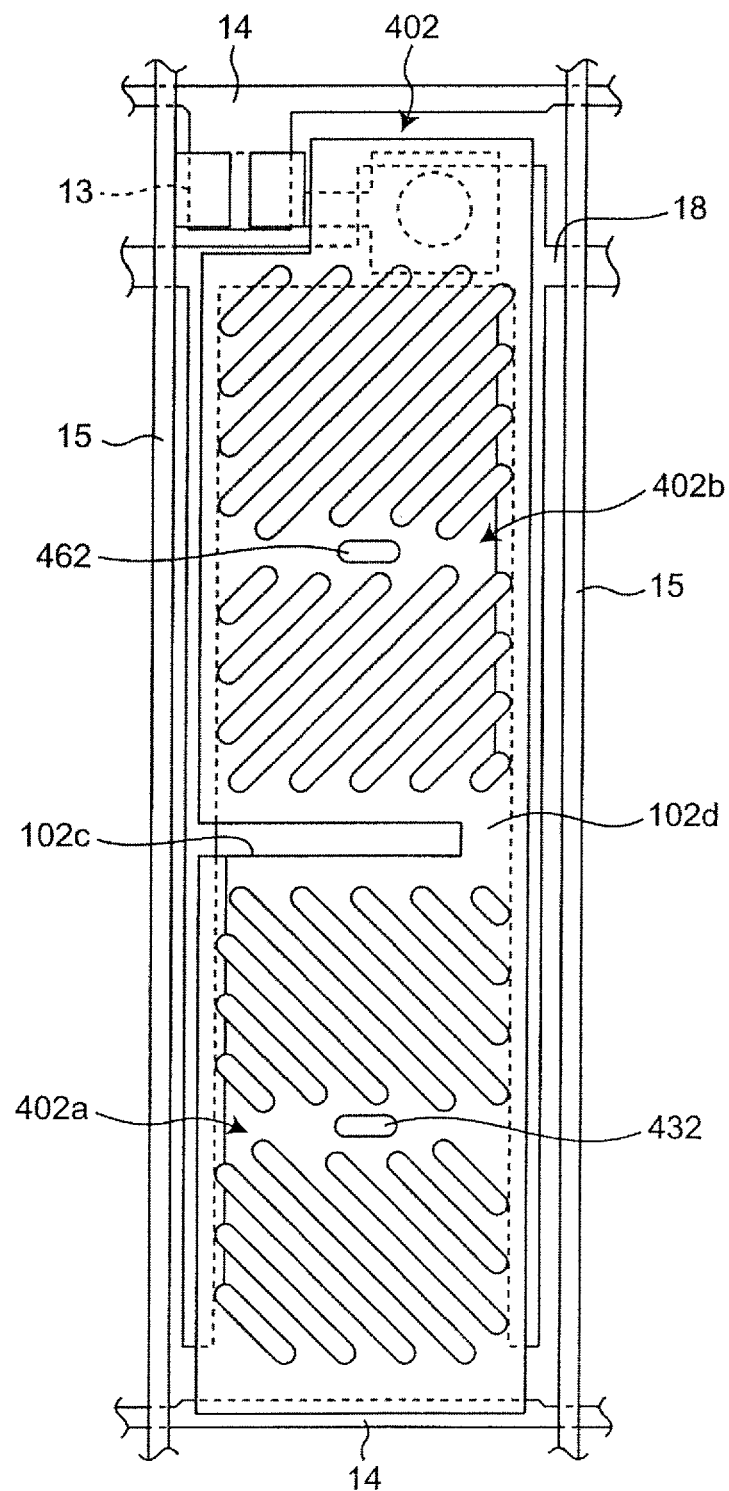
FIG. 16 An enlarged plan view of a pixel electrode according to a fourth embodiment of this invention and its neighborhood.

FIG. 16 is a plan view showing enlarged a pixel electrode 402 included in a liquid crystal display panel according to a fourth embodiment of this invention, and its neighborhood.

The liquid crystal display panel according to the fourth embodiment differs from the liquid crystal display panel according to the first embodiment in that it includes the pixel electrode 402 instead of the pixel electrode 102. In the liquid crystal display panel according to the fourth embodiment, any portion other than the pixel electrode 402 is configured similarly to its counterpart in the liquid crystal display panel according to the first embodiment.

The pixel electrode 402 includes: a first pixel electrode portion 402a opposed to domains 101a and 101b along the thickness direction (i.e., a direction perpendicular to the plane of the figure of FIG. 16); and a second pixel electrode portion 402b opposed to domains 101c and 101d along the thickness direction.

Figure 17:
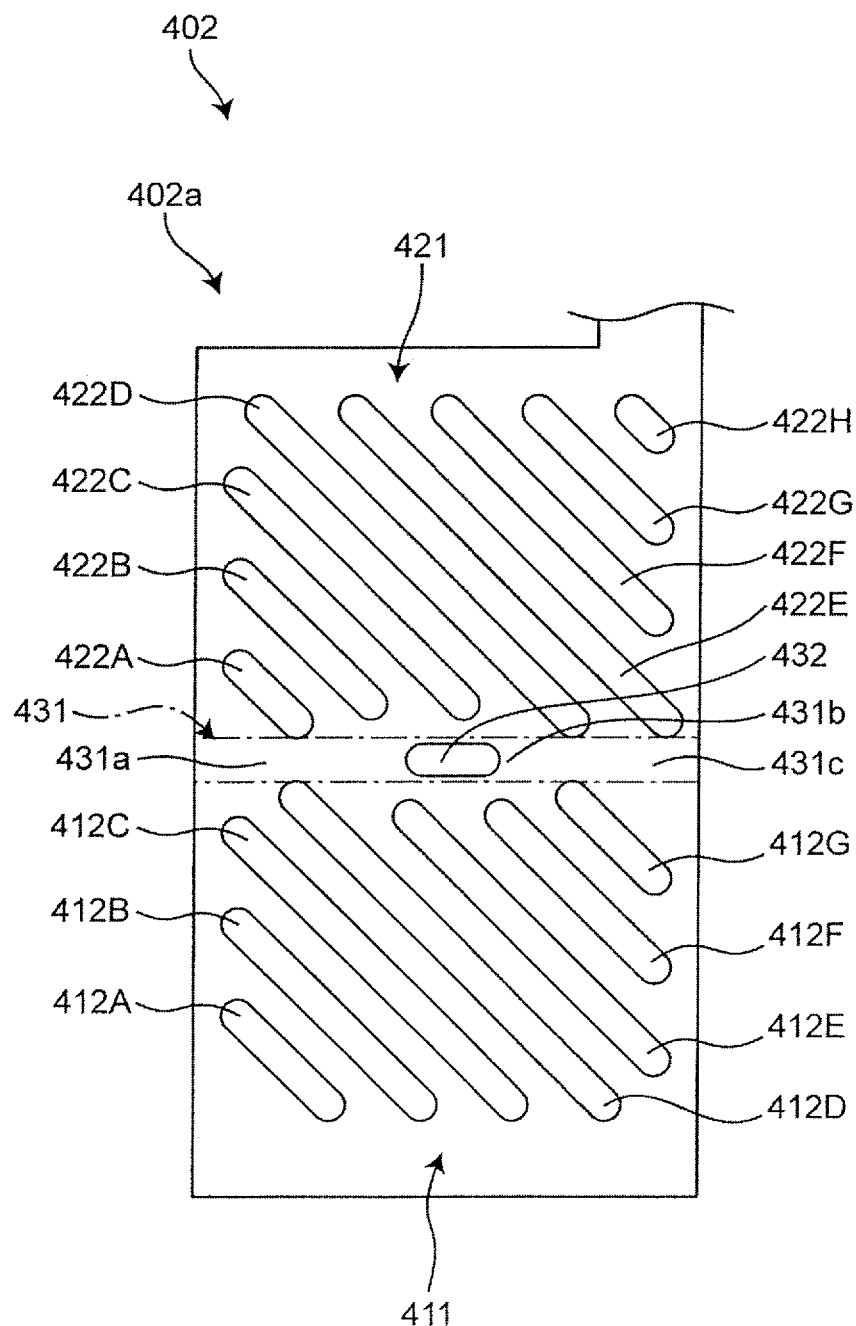
FIG. 17 An enlarged plan view of a first pixel electrode portion of the aforementioned pixel electrode.

FIG. 17 is a plan view showing enlarged the first pixel electrode portion 402a.

The first pixel electrode portion 402a includes: a first slitted region 411 opposed to the domain 101a along the thickness direction (i.e., a direction perpendicular to the plane of the figure of FIG. 17); a second slitted region 421 opposed to the domain 101b along the thickness direction; and a boundary region 431.

In the first slitted region 411, seven slits 412A to 412G extending along a direction parallel to the alignment azimuth of the liquid crystal molecules 41 in the domain 101a are formed. Note that the slits 412A to 412G are examples of first slits.

The slits 412A to 412G are mutually equal in width, while being set to mutually different lengths. The width of the slits 412A to 412G is set to e.g. 3.0 µm. The interval between the slits 412A to 412G is also set to e.g. 3.0 µm. In other words, the design pitch of the slits 412A to 412G may be set to e.g. 6.0 µm. Note that, in terms of improving transmittance of the pixel 101 the design pitch is preferably e.g. 7.0 µm or less, and in terms of facilitating fabrication the design pitch is preferably e.g. 5.2 µm or more.

In the second slitted region 421, eight slits 422A to 422H extending along a direction parallel to the alignment azimuth of the liquid crystal molecules 41 in the domain 101b are formed. Note that the slits 422A to 422H are examples of second slits.

The slits 422A to 422H also are mutually equal in width, while being set to mutually different lengths. The width of the slits 422A, to 422H is set to the same width as the width of the slits 412A to 412G. Moreover, the interval between the slits 422A to 422H is also set to the same interval as the interval between the slits 412A to 412G. Note that, in terms of improving transmittance of the pixel 101, the design pitch of the slits 422A to 422H also is e.g. 7.0 μm or less, and in terms of facilitating fabrication the design pitch is preferably e.g. 5.2 μm or more.

The boundary region 431 is provided between the first slitted region 411 and the second slitted region 421. The width of the boundary region 431 (i.e., the length along the up-down direction in FIG. 17) is set to the same width as the width of the slits 412A to 412G or the slits 422A to 422H. Moreover, the boundary region 431 includes a first end portion 431a, a central portion 431b, and a second end portion 431c arranged along the transverse direction of the pixel 101. Assuming that the pixel electrode 402 has a width (i.e., the length along the right-left direction in FIG. 17) L, then the first end portion 431a, the central portion 431b, and the second end portion 431c each have a length of L/3, for example, along their width direction. While no slits are provided in the first and second end portions 431a and 431c, a slit 432 is formed in the central portion 431b. Note that the slit 432 is an example of a third slit.

Regarding the first end portion 431a of the boundary region 431, the ends of the slits 412A to 412D that are closer to the boundary region 431 are disposed at one side in a direction along the longitudinal direction of the pixel 101. Moreover, regarding the first end portion 431a of the boundary region 431, the end of the slit 422A that is closer to the boundary region 431 is disposed at the other side in the direction along the longitudinal direction of the pixel 101.

Regarding the central portion 431b of the boundary region 431, the ends of the slits 412E, 412F that are closer to the boundary region 431 are disposed at one side in a direction along the longitudinal direction of the pixel 101. Moreover, regarding the central portion 431b of the boundary region 431, the ends of the slits 422B, 422C that are closer to the boundary region 431 are disposed at the other side in the direction along the longitudinal direction of the pixel 101.

Regarding the second end portion 431c of the boundary region 431, the end of the slit 412G that is closer to the boundary region 431 is disposed at one side in a direction along the longitudinal direction of the pixel 101. Moreover, regarding the central portion 431b of the boundary region 431, the ends of the slits 422D to 422H that are closer to the boundary region 431 are disposed at the other side in the direction along the longitudinal direction of the pixel 101.

The slit 432 extends along the transverse direction of the pixel 101. Moreover, the slit 432 is at a predetermined interval from the ends of the slits 412E, 412F that are closer to the boundary region 431b and at a predetermined interval from the ends of the slits 4228, 422C that are closer to the boundary region 431b, thus leaving the slits 412E, 412F unconnected with the slits 4228, 422C.

Moreover, the ends of the slits 412D, 412G that are closer to the boundary region 431 are mutually aligned in the transverse direction of the pixel 101. Moreover, the ends of the slits 412E, 412F that are closer to the boundary region 431b also are mutually aligned in the transverse direction of the pixel 101. Furthermore, the ends of the slits 412D, 412G that are closer to the boundary region 431 are located nearer the boundary region 431 than are the ends of the slits 412A to 412C, 412E, 412F that are closer to the boundary region 431. Stated in reverse, the ends of the slits 412A to 412C, 412E, 412F that are closer to the boundary region 431 are located more toward the opposite side from the boundary region 431 than are the ends of the slits 412D, 412G that are closer to the boundary region 431. More specifically, the ends of the slits 412D, 412G that are closer to the boundary region 431 reach the boundary region 431, but the ends of the slits 412A to 412C, 412E, 412F that are closer to the boundary region 431 do not reach the boundary region 431.

Moreover, the ends of the slit 422A, 422D, 422E that are closer to the boundary region 431 are mutually aligned in the transverse direction of the pixel 101. Moreover, the ends of the slits 422B, 422C that are closer to the boundary region 431 also are mutually aligned in the transverse direction of the pixel 101. Furthermore, the ends of the slit 422A, 422D, 422E that are closer to the boundary region 431 are located nearer the boundary region 431 than are the ends of the slits 422B, 422C, 422F to 422H that are closer to the boundary region 431. Stated in reverse, the ends of the slits 422B, 422C, 422F to 422H that are closer to the boundary region 431 are located more toward the opposite side from the boundary region 431 than are the ends of the slit 422A, 422D, 422E that are closer to the boundary region 431. More specifically, the ends of the slit 422A, 422D, 422E that are closer to the boundary region 431 reach the boundary region 431, but the ends of the slits 422B, 422C, 422F to 422H that are closer to the boundary region 431 do not reach the boundary region 431.

Moreover, a figure that is presented by the slits 412A to 412G, the slits 422A to 422H, and the slit 432 is not a point-symmetric figure.

Figure 18:
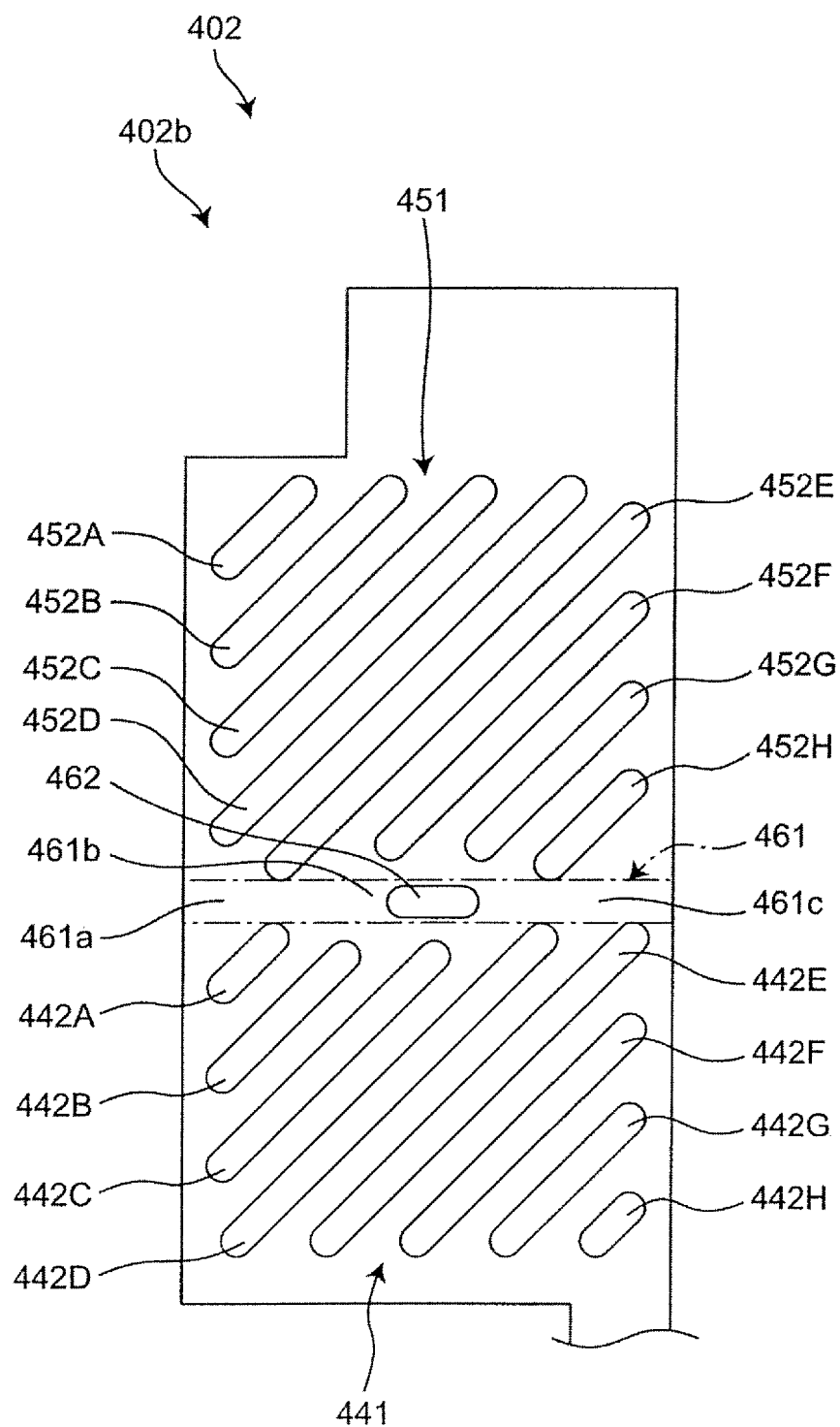
FIG. 18 An enlarged plan view of a second pixel electrode portion of the aforementioned pixel electrode.

FIG. 18 is a plan view showing enlarged the second pixel electrode portion 402b.

The second pixel electrode portion 402b includes: a first slitted region 441 opposed to the domain 101c along the thickness direction (i.e., a direction perpendicular to the plane of the figure of FIG. 18); a second slitted region 451 opposed to the domain 101d along the thickness direction; and a boundary region 461.

In the first slitted region 441, eight slits 442A to 442H extending along a direction parallel to the alignment azimuth of the liquid crystal molecules 41 in the domain 101c are formed. Note that the slits 442A to 442H are examples of first slits.

The slits 442A to 442H are mutually equal in width, while being set to mutually different lengths. The width of the slits 442A to 442H is set to e.g. 3.0 μm. Herein, the interval between the slits 442A to 442H is also set to e g. 3.0 μm. In other words, the design pitch of the slits 442A to 442H may be set to e.g. 6.0 μm. Note that, in terms of improving transmittance of the pixel 101 the design pitch is preferably e.g. 7.0 μm or less, and in terms of facilitating fabrication the design pitch is preferably e.g. 5.2 μm or more.

In the second slitted region 451, eight slits 452A to 452H extending along a direction parallel to the alignment azimuth of the liquid crystal molecules in the domain 101d are formed. Note that the slits 452A to 452H are examples of second slits.

The slits 452A to 452H also are mutually equal in width, while being set to mutually different lengths. The width of the slits 452A to 452H is set to the same width as the width of the slits 442A to 442H. Moreover, the interval between the slits 452A to 452H is set to the same interval as the interval between the slits 442A to 442H. Note that, in terms of improving transmittance of the pixel 101, the design pitch of the slits 452A to 452H also is e.g. 7.0 µm or less, and in terms of facilitating fabrication the design pitch is preferably e.g. 5.2 µm or more.

The boundary region 461 is provided between the first slitted region 441 and the second slitted region 451. The width of the boundary region 461 (i.e., the length along the up-down direction in FIG. 18) is set to the same width as the width of the slits 442A to 442H or the slits 452A to 452H. Moreover, the boundary region 461 includes a first end portion 461a, a central portion 461b, and a second end portion 461c arranged along the transverse direction of the pixel 101. Assuming that the pixel electrode 402 has a width (i.e., the length along the right-left direction in FIG. 14) L, then the first end portion 461a, the central portion 461b, and the second end portion 461c each have a length of L/3, for example, along their width direction. While no slits are provided in the first and second end portions 461a and 461c, a slit 462 is formed in the central portion 461b. Note that the slit 462 is an example of a third slit.

Regarding the first end portion 461a of the boundary region 461, the end of the slit 442A that is closer to the boundary region 461 is disposed at one side in a direction along the longitudinal direction of the pixel 101. Moreover, regarding the first end portion 461a of the boundary region 461, the ends of the slits 452A to 452E that are closer to the boundary region 461 are disposed at the other side in the direction along the longitudinal direction of the pixel 101.

Regarding the central portion 461b of the boundary region 461, the ends of the slits 442B, 442C that are closer to the boundary region 461 are disposed at one side in a direction along the longitudinal direction of the pixel 101. Moreover, regarding the central portion 461b of the region 461, the ends of the slits 452F, 452G that are closer to the boundary region 461 are disposed at the other side in the direction along the longitudinal direction of the pixel 101.

Regarding the second end portion 461c of the boundary region 461, the ends of the slits 442D to 442H that are closer to the boundary region 461 are disposed at one side in a direction along the longitudinal direction of the pixel 101. Moreover, regarding the second end portion 461c of the boundary region 461, the end of the slit 452H that is closer to the boundary region 461 is disposed at the other side in the direction along the longitudinal direction of the pixel 101.

The slit 462 extends along the transverse direction of the pixel 101. Moreover, it is at a predetermined interval from the ends of the slits 442B, 442C that are closer to the boundary region 431b, and at a predetermined interval from the ends of the slits 452F, 452G that are closer to the boundary region 431b, thus leaving the slits 442B, 442C unconnected with the slits 452F, 452G.

Moreover, the ends of the slits 442A, 442D, 442E that are closer to the boundary region 461 are mutually aligned in the transverse direction of the pixel 101. Moreover, the ends of the slits 442B, 442C that are closer to the boundary region 461 also are mutually aligned in the transverse direction of the pixel 101. Furthermore, the ends of the slits 442A, 442D, 442E that are closer to the boundary region 461 are located nearer the boundary region 461 than are the ends of the slits 442B, 442C, 442F to 442H that are closer to the boundary region 461. Stated in reverse, the ends of the slits 442B, 442C, 442F to 442H that are closer to the boundary region 461 are located more toward the opposite side from the boundary region 461 than are the ends of the slits 442A, 442D, 442E that are closer to the boundary region 461. More specifically, the ends of the slits 442A, 442D, 442E that are closer to the boundary region 461 reach the boundary region 461, but the ends of the slits 442B, 442C, 442F to 442H that are closer to the boundary region 461 do not reach the boundary region 461.

Moreover, the ends of the slits 452E, 452H that are closer to the boundary region 461 are mutually aligned in the transverse direction of the pixel 101. Moreover, the ends of the slits 452F, 452G that are closer to the boundary region 461 also are mutually aligned in the transverse direction of the pixel 101. Furthermore, the ends of the slits 452E, 452H that are closer to the boundary region 461 are located nearer the boundary region 461 than are the ends of the slits 452A to 452D, 452F, 452G that are closer to the boundary region 461. Stated in reverse, the ends of the slits 452A to 452D, 452F, 452G that are closer to the boundary region 461 are located more toward the opposite side from the boundary region 461 than are the ends of the slits 452E, 452H that are closer to the boundary region 461. More specifically, the ends of the slits 452E, 452H that are closer to the boundary region 461 reach the boundary region 461, but the ends of the slits 452A to 452D, 452F, 452G that are closer to the boundary region 461 do not reach the boundary region 461.

Moreover, a figure that is presented by the slits 442A to 442H, the slits 452A to 452H, and the slit 462 is not a point-symmetric figure.

Moreover, as shown in FIG. 16, the slit 432 of the first pixel electrode portion 402a and the slit 462 of the second pixel electrode portion 402b are mutually aligned in the longitudinal direction of the pixel 101.

With the liquid crystal display panel of the above configuration, no slits are formed in the first end portions 431a and 461a of the boundary regions 431 and 461 and in the second end portions 431c and 461c of the boundary regions 431 and 461, but the slits 432, 462 are formed in the central portions 431b and 461b of the boundary regions 431 and 461, whereby similar actions and effects as those in the first embodiment are obtained.

Moreover, the slits 412A to 412G are not connected with the slits 422A to 422H via the slit 432. Moreover, the slits 442A to 442H also are not connected with the slits 452A to 452H via the slit 462. Therefore, the slits 412A to 412G, slits 422A to 422H, slits 442A to 442H, and slits 452A to 452H can be disposed in arbitrary manners even if they are not symmetrically shaped owing to factors such as pixel size, pixel shape, etc., whereby a high degree of design freedom is provided.

Moreover, the slit 432 extends along the transverse direction of the pixel 101, whereby disorder in the shape of a double dark line ascribable to the domain 101a and the domain 101b can be prevented.

Moreover, the slit 462 extends along the transverse direction of the pixel 101, whereby disorder in the shape of a double dark line ascribable to the domain 101c and the domain 101d can be prevented.

Moreover, the ends of the slits 412E, 412F that are closer to the boundary region 431 are located more toward the opposite side from the boundary region 431 than are the ends of the slits 412D, 412G that are closer to the boundary region 431. Moreover, the ends of the slits 422B, 422C that are closer to the boundary region 431 are located more toward the opposite side from the boundary region 431 than are the ends of the slit 422A, 422D, 422E that are closer to the boundary region 431. This can restrain the slits 412E, 412F, 422B, 422C from becoming connected with the slit 432 due to manufacturing variation.

Moreover, the ends of the slits 442B, 442C that are closer to the boundary region 461 are located more toward the opposite side from the boundary region 461 than are the ends of the slits 442A, 442D, 442E that are closer to the boundary region 461. Moreover, the ends of the slits 452F, 452G that are closer to the boundary region 461 are located more toward the opposite side from the boundary region 461 than are the ends of the slits 452E, 452H that are closer to the boundary region 461. This can restrain the slits 442B, 442C, 452F, 452G from becoming connected with the slit 462 due to manufacturing variation.

Figure 19:
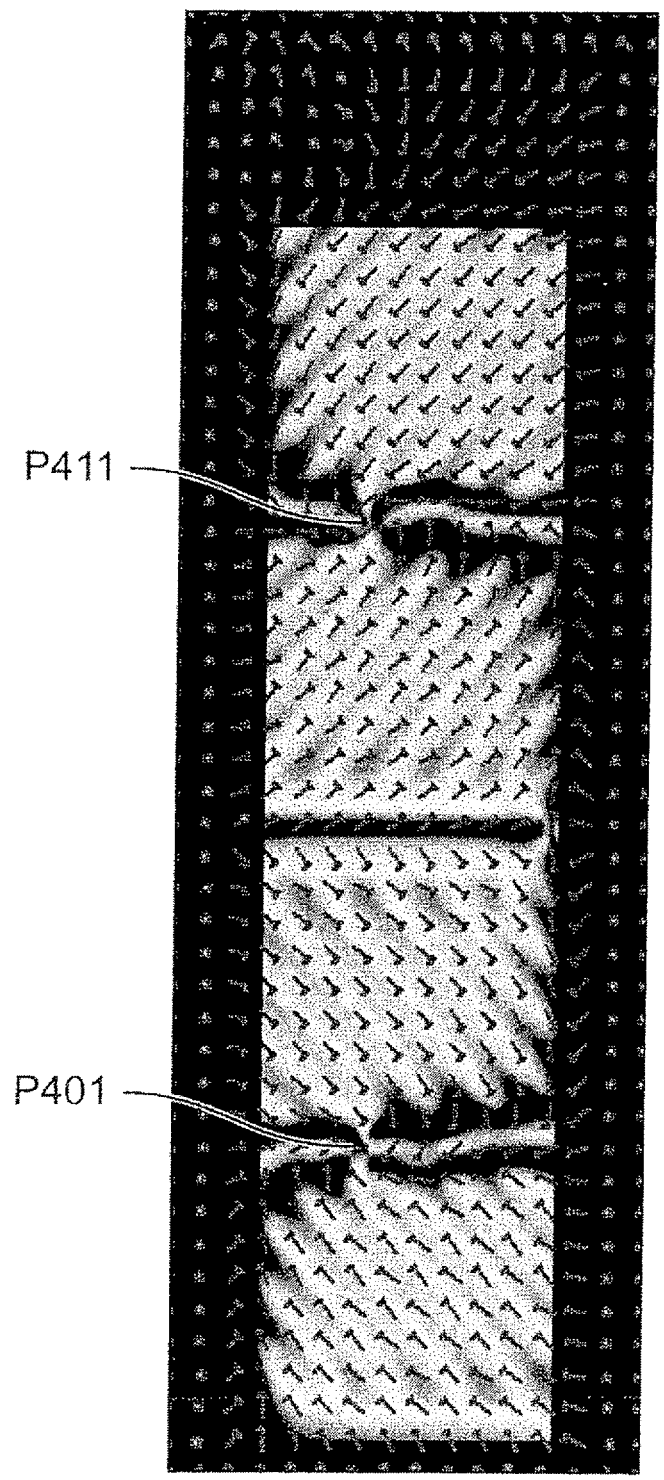
FIG. 19 A photographic representation of a simulation of dark lines in the fourth embodiment.

FIG. 19 is a photographic representation of one pixel, showing a result of simulating occurrence of dark lines in the fourth embodiment. In FIG. 19, liquid crystal molecules 41 under an applied voltage across the liquid crystal layer 30 are depicted as bolt shapes, as in FIG. 7.

It can be seen from FIG. 19 that a disclination P401 occurs above the neighborhood of the slit 432 of the first pixel electrode portion 402a, and a disclination P411 occurs above the neighborhood of the slit 462 of the second pixel electrode portion 402b, and that the disclination P401 and the disclination P411 are mutually aligned in the longitudinal direction of the pixel 101.

Moreover, no other disclination than the disclination P401 occurs above the first pixel electrode portion 402a, and no other disclination than the disclination P411 occurs above the second pixel electrode portion 402b.

Reference Example

Hereinafter, a liquid crystal display panel according to Reference Example of this invention will be described, where any constituent elements that are identical to constituent elements of the first or fourth embodiment will be denoted by identical reference numerals to those of the constituent elements in the first or fourth embodiment.

Figure 20:
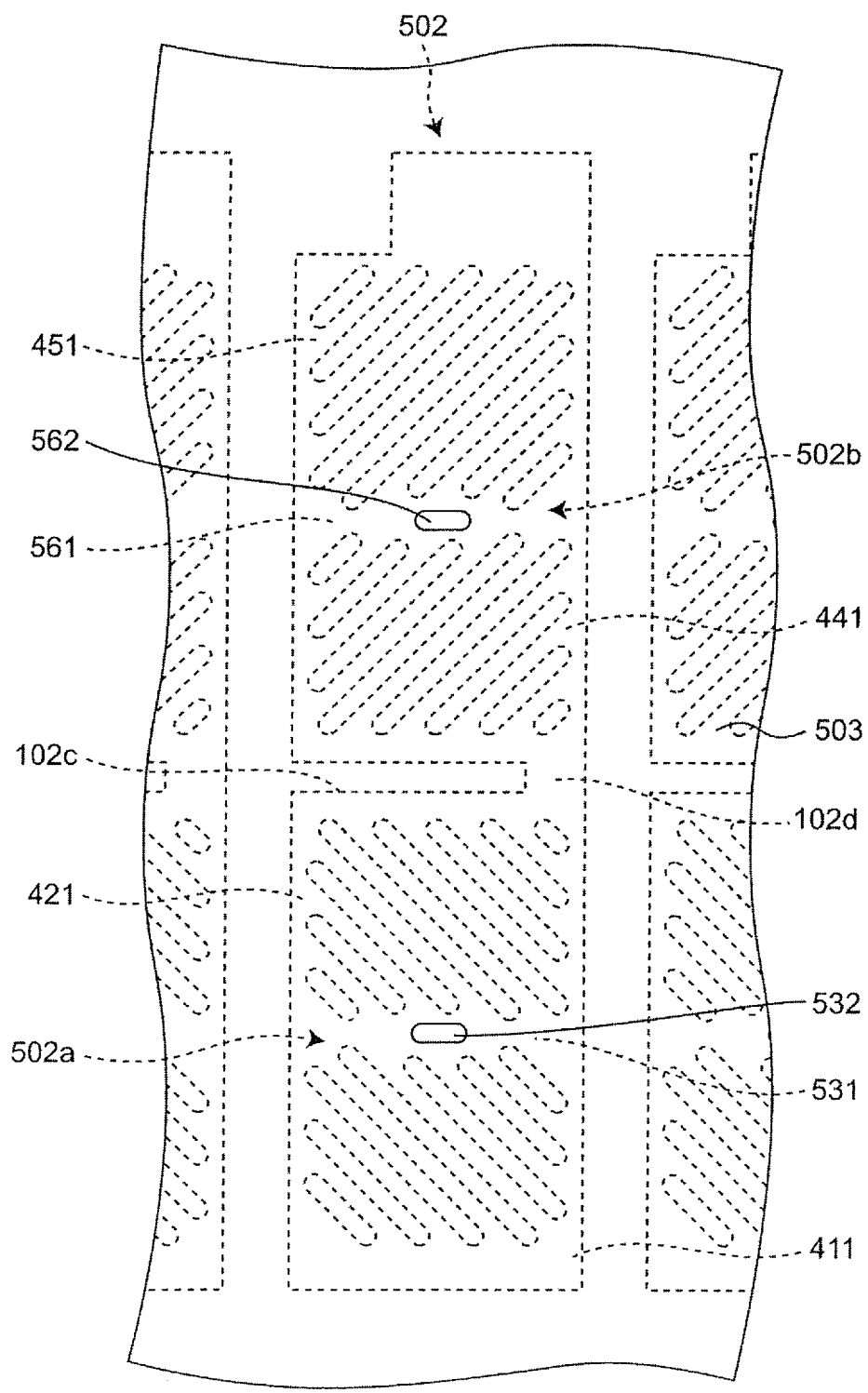
FIG. 20 A plan view of an essential portion of a liquid crystal display panel according to Reference Example of this invention.
Figure 21:
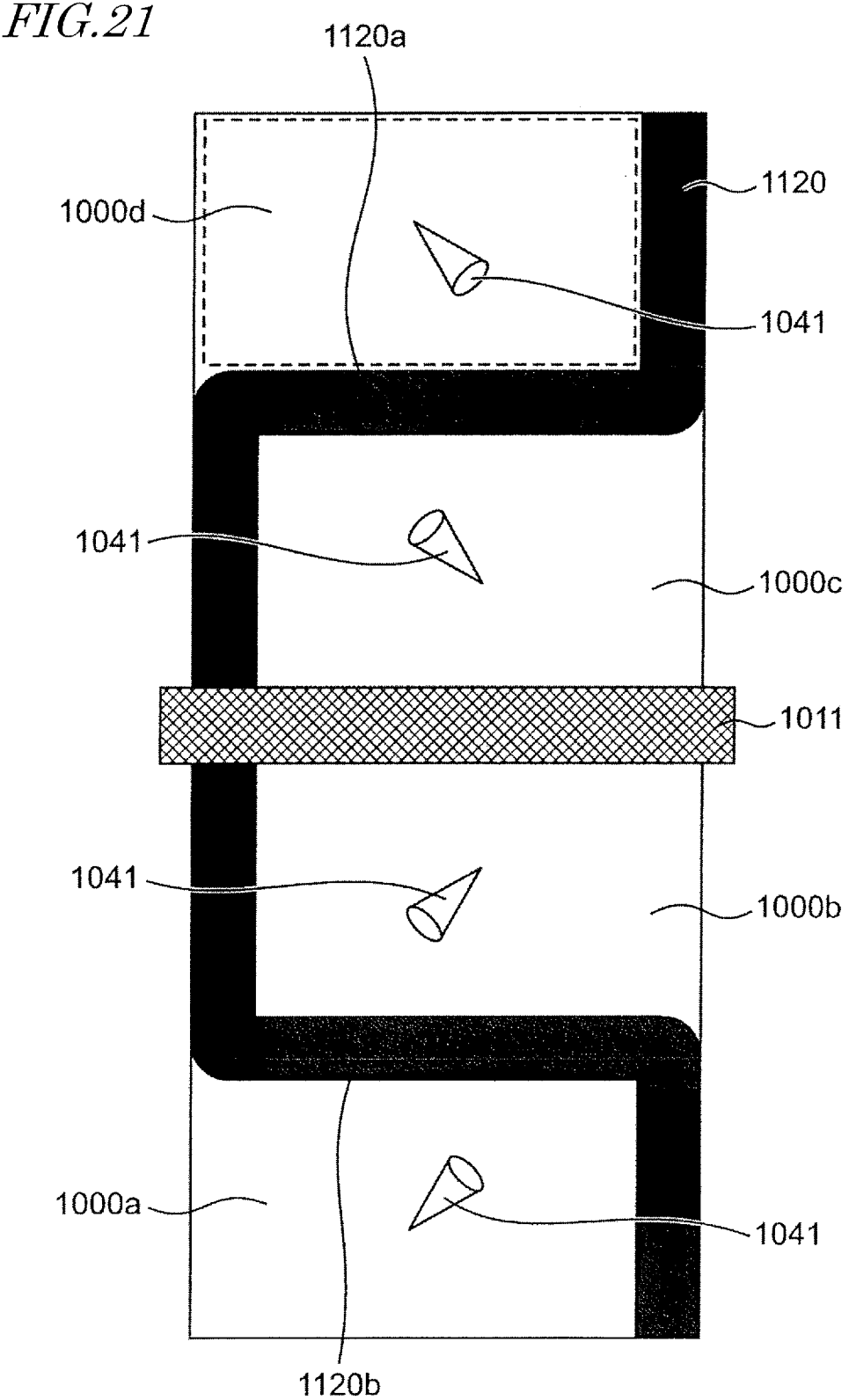
FIG. 21 A schematic plan view for describing a dark line in a conventional liquid crystal display panel.
Figure 22:
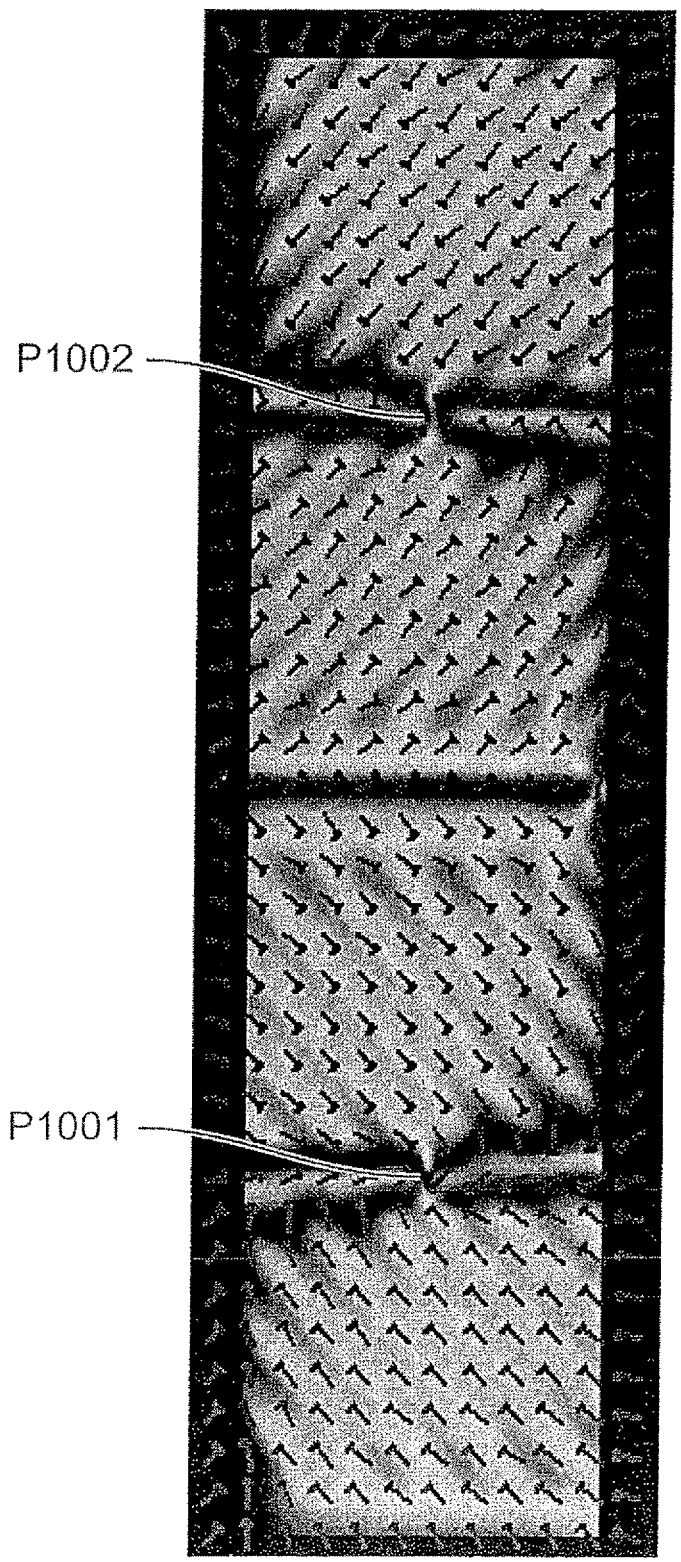
FIG. 22 A photographic representation of a simulation of the aforementioned dark lines.

FIG. 20 is a plan view of an essential portion of a liquid crystal display panel according to Reference Example of this invention.

The liquid crystal display panel according to Reference Example differs from the liquid crystal display panel according to the first embodiment in that it includes a pixel electrode 502 instead of the pixel electrode 102 and a counter electrode 503 instead of the counter electrode 103. In the liquid crystal display panel according to Reference Example, any portion other than pixel electrode 502 and the counter electrode 503 is configured similarly to its counterpart in the liquid crystal display panel according to the first embodiment.

The pixel electrode 502 includes: a first pixel electrode portion 502a opposed to domains 101a and 101b along the thickness direction (i.e., a direction perpendicular to the plane of the figure of FIG. 16); and a second pixel electrode portion 502b opposed to domains 101c and 101d along the thickness direction.

The first pixel electrode portion 502a includes a first slitted region 411, a second slitted region 421, and a boundary region 531. The boundary region 531 differs from the boundary region 431 only in that it does not have any slits.

The second pixel electrode portion 502b includes a first slitted region 441, a second slitted region 451, and a boundary region 561. The boundary region 561 differs from the boundary region 461 only in that it does not have any slits.

The counter electrode 503 has a slit 532 provided in a region opposed to the first pixel electrode portion 502a, and a slit 562 provided in a region opposed to the second pixel electrode portion 502b. More specifically, the slit 532 is located above a portion corresponding to a middle portion 431b of the boundary region 531, whereas the slit 562 is located above a portion corresponding to a middle portion 461b of the boundary region 561.

With the liquid crystal display panel of the above configuration, by providing the slits 532, 562 in the counter electrode 503, similar actions and effects as those in the fourth embodiment are obtained.

Although specific embodiments of this invention have been described, this invention is not to be limited to the above-described first to fifth embodiments and variations thereof; rather, this invention can be practiced with various alterations within its scope. For example, some of the details described in the first to fourth embodiments and Reference Example may be deleted or replaced to provide an embodiment of this invention. Moreover, alterations as described for the first embodiment may be applied to the second to fourth embodiments and Reference Example to provide an embodiment of this invention.

Moreover, description of Japanese Patent No. 5184618, Japanese Laid-Open Patent Publication No. 2011-85738, and International Publication No. 2017/047532 is also applicable to the liquid crystal display panel of this invention. For example, as examples of materials and production methods of liquid crystal display panels according to this invention, the materials and production methods, etc., described in Japanese Patent No. 5184618 Japanese Laid-Open Patent Publication No. 2011-85738, and International Publication No. 2017/047532 can be adopted.

That is, the above disclosure can be summarized as follows.

A liquid crystal display panel according to one implementation of this invention is a liquid crystal display panel having a display mode that is a VA mode, including:

a plurality of rectangular-shaped pixels 101;

a first substrate section 10 including a first substrate 11 and pixel electrodes 102, 202, 302, 402;

a liquid crystal layer 30 provided on the first substrate section 10, the liquid crystal layer 30 containing liquid crystal molecules 41; and a second substrate section 50 provided on the liquid crystal layer 30, the second substrate section 50 including a second substrate 51 and a counter electrode 103, wherein, the plurality of pixels 101 each include first and second domains 101a, 101c, 101b, 101d arranged along a longitudinal direction of the pixel 101;

when a direction orthogonal to the longitudinal direction of the pixel 101 is defined as a transverse direction of the pixel 101 and an azimuth flush with the transverse direction of the pixel 101 is defined as 0°, an alignment azimuth of the liquid crystal molecules 41 in the first domain 101a, 101c is substantially 45° and an alignment azimuth of the liquid crystal molecules 41 in the second domain 101b, 101d is substantially 225°; or an alignment azimuth of the liquid crystal molecules 41 in the first domain 101a, 101c is substantially 135° and an alignment azimuth of the liquid crystal molecules 41 in the second domain 101b, 101d is substantially 315°;

each pixel electrode 102, 202, 302, 402 includes a first slitted region 111, 141, 211, 241, 311, 341, 411, 441 in which plurality of first slits 112A to 112G, 142A to 142H, 212A to 212H, 242A to 242H, 312A to 312G, 342A to 342H, 412A to 412G, 442A to 442H extending along a direction parallel to the alignment azimuth of the liquid crystal molecules 41 in the first domain 101a, 101c are formed, and a second slitted region 121, 151, 221, 251, 321, 351, 421, 451 in which a plurality of second slits 122A to 122H, 152A to 152H, 222A to 222H, 252A to 252H, 322A to 322H, 352A to 352H, 422A to 422H, 452A to 452H extending along a direction parallel to the alignment azimuth of the liquid crystal molecules 41 in the second domain 101*b*, 101*d* are formed, and a boundary region 131, 161, 231, 261, 331, 361, 431, 461 provided between the first slitted region 111, 141, 211, 241, 311, 341, 411, 441 and the second slitted region 121, 151, 221, 251, 321, 351, 421, 451;

the boundary region 131, 161, 231, 261, 331, 361, 431, 461 includes a first end portion 131*a*, 161*a*, 231*a*, 261*a*, 331*a*, 361*a*, 431*a*, 461*a*, a central portion 131*b*, 161*b*, 231*b*, 261*b*, 331*b*, 361*b*, 431*b*, 461*b*, and a second end portion 131*c*, 161*c*, 231*c*, 261*c*, 331*c*, 361*c*, 431*c*, 461*c* arranged along the transverse direction of the pixel 101; and no slits are formed in the first and second end portions 131*a*, 161*a*, 231*a*, 261*a*, 331*a*, 361*a*, 431*a*, 461*a*, 131*c*, 161*c*, 231*c*, 261*c*, 331*c*, 361*c*, 431*c*, 461*c* of the boundary region 131, 161, 231, 261, 331, 361, 431, 461, and at least one third slit 132, 162, 232, 262, 332, 362, 432, 462 is formed in the central portion 131*b*, 161*b*, 231*b*, 261*b*, 331*b*, 361*b*, 431*b*, 461*b* of the boundary region 131, 161, 231, 261, 331, 361, 431, 461.

With the above configuration, when a voltage is applied to the liquid crystal layer 30, a double dark line occurs near the boundary between the first domain 101*a*, 101*c* and the second domain 101*b*, 101*d*. At this time, since no slits are formed in the first and second end portions 131*c*, 161*c*, 231*c*, 261*c*, 331*c*, 361*c*, 431*c*, 461*c* of the boundary region 131, 161, 231, 261, 331, 361, 431, 461, but at least one third slit 132, 162, 232, 262, 332, 362, 432, 462 is formed in the central portion 131*b*, 161*b*, 231*b*, 261*b*, 331*b*, 361*b*, 431*b*, 461*b* of the boundary region 131, 161, 231, 261, 331, 361, 431, 461, alignment azimuths of the liquid crystal molecules 41 are stabilized above or near the third slit 132, 162, 232, 262, 332, 362, 432, 462. Therefore, disclinations P101 to P103, P111 to P113, P201 to P203, P211 to P213, P301 to P303, P311 to P313, P401, P411 occur above or near the third slit 132, 162, 232, 262, 332, 362, 432, 462. Therefore, variation in the sites of occurrence of the disclinations P101 to P103, P111 to P113, P201 to P203, P211 to P213, P301 to P303, P311 to P313, P401, P411 can be suppressed, thereby making it possible to improve on coarseness of display and provide an enhanced display quality.

In a liquid crystal display panel according to one embodiment, the third slit 132, 162, 232, 262, 332, 362 merges with an end of one first slit 112F, 142C, 212G, 242B, 31.2F, 342B among the plurality of first slits 112A to 112G, 142A to 142H, 212A to 212H, 242A to 242H, 312A to 312G, 342A to 34211 that is closer to the boundary region 131, 161, 231, 261, 331, 361, and merges with an end of one second slit 122C, 152G, 2228, 252G, 3228, 352G among the plurality of second slits 122A to 122H, 152A to 152H, 222A to 222H, 252A to 252H, 322A to 322H, 352A to 352H, 422A to 422H, 452A to 452H that is closer to the boundary region 131, 161, 231, 261, 331, 361, 431, 461, thus connecting the first slit 112F, 142C, 212G, 242B, 312F, 3428 with the second slit 122C, 152G, 2228, 252G, 322B, 352G.

According to the above embodiment, because the first slit 112F, 142C, 212G, 242B, 312F, 342B is connected with the second slit 122C, 152G, 222B, 252G, 322B, 352G via the third slit 132, 162, 232, 262, 332, 362, alignment azimuths of the liquid crystal molecules 41 are stabilized above the third slit 132, 162, 232, 262, 332, 362. This allows a disclination P101, P111, P201, P211, P301, P311 to occur above the third slit 132, 162, 232, 262, 332, 362 with certainty.

In a liquid crystal display panel according to one embodiment, the third slit 132, 162 extends along the longitudinal direction of the pixel 101.

According to the above embodiment, because the third slit 132, 162 extends along the longitudinal direction of the pixel 101, disclinations are stabilized on both sides of the third slit 132, 162. This increases the number of disclinations in a double dark line, whereby the width of the double dark line can be reduced. This promotes the effect of preventing a decrease in the light transmittance of the liquid crystal layer 30.

In a liquid crystal display panel according to one embodiment, the third slit 432, 462 is at a predetermined interval from ends of the first slits 412A to 412G, 442A to 442H that are closer to the boundary region 431, 461, and at a predetermined interval from ends of the second slits 422A to 422H, 452A to 452H that are closer to the boundary region 431, 461, thus leaving the first slits 412A to 412G, 442A to 442H unconnected with the second slits 422A to 422H, 452A, to 452H.

According to the above embodiment, because the first slits 412A to 412G, 442A to 442H are not connected with the second slits 422A to 422H, 452A to 452H via the third slit 432, 462, the first slits 412A to 412G, 442A to 442H and the second slits 422A to 422H, 452A to 452H can be disposed in arbitrary manners even if they are not symmetrically shaped owing to factors such as pixel size, pixel shape, etc., whereby a high degree of design freedom is provided.

In a liquid crystal display panel according to one embodiment, the third slit 232, 262, 432, 462 extends along the transverse direction of the pixel 101.

According to the above embodiment, because the third slit 232, 262, 432, 462 extends along the transverse direction of the pixel 101, disorder in the shape of a double dark line ascribable to the first domain 101*a*, 101*c* and the second domain 101*b*, 101*d* can be prevented.

In a liquid crystal display panel according to one embodiment, among ends of the plurality of first slits 212A to 212H, 242A to 242H, 312A to 312G, 342A to 342H, 412A to 412G, 442A to 442H that are closer to the boundary region 231, 261, 331, 361, 431, 461, an end(s) that is adjacent to the central portion 231*b*, 261*b*, 331*b*, 361*b*, 431*b*, 461*b* of the boundary region 231, 261, 331, 361, 431, 461 is located more toward an opposite side from the boundary region 231, 261, 331, 361, 431, 461 than are ends that are adjacent to the first and second end portions 231*a*, 261*a*, 331*a*, 361*a*, 431*a*, 461*a*, 231*c*, 261*c*, 331*c*, 361*c*, 431*c*, 461*c* of the boundary region 231, 261, 331, 361, 431, 461; and among ends of the plurality of second slits 222A to 222H, 252A to 252H, 322A to 322H, 352A to 352H, 422A to 422H, 452A to 452H that are closer to the boundary region 231, 261, 331, 361, 431, 461, an end (s) that is adjacent to the central portion 231*b*, 261*b*, 331*b*, 361*b*, 431*b*, 461*b* of the boundary region 231, 261, 331, 361, 431, 461 is located more toward an opposite side from the boundary region 231, 261, 331, 361, 431, 461 than are ends that are adjacent to the first and second end portions 231*a*, 261*a*, 331*a*, 361*a*, 431*a*, 461*a*, 231*c*, 261*c*, 331*c*, 361*c*, 431*c*, 461*c* of the boundary region 231, 261, 331, 361, 431, 461.

According to the above embodiment, among ends of the plurality of first slits 212A to, 212H, 242A to 242H, 312A to 312G, 342A to 342H, 412A to 412G, 442A to 442H that are closer to the boundary region 231, 261, 331, 361, 431, 461, an end (s) that is adjacent to the central portion 231b, 261b, 331b, 361b, 431b, 461b of the boundary region 231, 261, 331, 361, 431, 461 is located more toward the opposite side from the boundary region 231, 261, 331, 361, 431, 461 than are ends that are adjacent to the first and second end portions 231a, 261a, 331a, 361a, 431a, 461a, 231c, 261c, 331c, 361c, 431c, 461c of the boundary region 231, 261, 331, 361, 431, 461. Therefore, the end(s) that is/are adjacent to the central portion 231b, 261b, 331b, 361b, 431b, 461b of the boundary region 231, 261, 331, 361, 431, 461 can be restrained from becoming connected with the third slit 232, 262, 332, 363, 432, 462 owing to manufacturing variation.

Moreover, among ends of the plurality of second slits 222A to 222H, 252A to 252H, 322A to 322H, 352A to 352H, 422A to 422H, 452A to 452H that are closer to the boundary region 231, 261, 331, 361, 431, 461, an end(s) that is adjacent to the central portion 231b, 261b, 331b, 361b, 431b, 461b of the boundary region 231, 261, 331, 361, 431, 461 is located more toward the opposite side from the boundary region 231, 261, 331, 361, 431, 461 than are ends that are adjacent to the first and second end portions 231a, 261a, 331a, 361a, 431a, 461a, 231c, 261c, 331c, 361c, 431c, 461c of the boundary region 231, 261, 331, 361, 431, 461. Therefore, the end (s) that is/are adjacent to the central portion 231b, 261b, 331b, 361b, 431b, 461b of the boundary region 231, 261, 331, 361, 431, 461 can be restrained from becoming connected with the third slit 232, 262, 332, 363, 432, 462 owing to manufacturing variation.

In a liquid crystal display panel according to one embodiment,
a figure that is presented by the plurality of first slits 212A to 212H, 242A to 242H, the plurality of second slits 222A to 222H, 252A to 252H, and the third slit 232, 262 is a point-symmetric figure.

According to the above embodiment, because a figure that is presented by the plurality of first slits 212A to 212H, 242A to 242H, the plurality of second slits 222A to 222H, 252A to 252H, and the third slit 232, 262 is a point-symmetric figure, disorder in the shape of a double dark line ascribable to the first domain 101a, 101c and the second domain 101b, 101d can be prevented.

REFERENCE SIGNS LIST 10 first substrate section,
11 first glass substrate
20 first vertical alignment film
30 liquid crystal layer
41 liquid crystal molecule
40 second vertical alignment film
50 second substrate section
51 second glass substrate
90 sealing member
101 pixel
101a to 101d domain
102, 202, 302, 402 pixel electrode
103 counter electrode
102a, 202a, 302a, 402a, 502a first pixel electrode portion
102b, 202b, 302b, 402b, 502b second pixel electrode portion
111, 141, 211, 241, 311, 341, 411, 441 first slitted region
112A to 112G, 122A to 122H, 132, 142A to 142H, 152A to 152H,
162, 212A to 212H, 222A to 222H, 232, 242A to 242H, 252A to 252H,
262, 312A to 312G, 322A to 322H, 332, 342A to 342H, 352A to 352H,
362, 412A to 412G, 422A to 422H, 432, 442A to 442H, 452A to 452H, 462 slit
121, 151, 221, 251, 321, 351, 421, 451 second slitted region
131, 161, 231, 261, 331, 361, 431, 461, 531, 561 boundary region
131a, 161a, 231a, 261a, 331a, 361a, 431a, 461a first end portion
131b, 161b, 231b, 261b, 331b, 361b, 431b, 461b central portion
131c, 161c, 231c, 261c, 331c, 361c, 431c, 461c second end portion
P101 to P103, P111 to P113, P201 to P203, P211 to P213, P301 to P303, P311 to P313, P401, P411 disclination

The invention claimed is:
1. A liquid crystal display panel having a display mode that is a vertical alignment (VA) mode, comprising:
a plurality of rectangular-shaped pixels;
a first substrate section including a first substrate and pixel electrodes;
a liquid crystal layer provided on the first substrate section, the liquid crystal layer containing liquid crystal molecules; and
a second substrate section provided on the liquid crystal layer, the second substrate section including a second substrate and a counter electrode, wherein;
the plurality of pixels each include first and second domains adjacently arranged along a longitudinal direction of the pixel;
when a direction orthogonal to the longitudinal direction of the pixel is defined as a transverse direction of the pixel and an azimuth flush with the transverse direction of the pixel is defined as 0°, an alignment azimuth of the liquid crystal molecules in the first domain is substantially 45° and an alignment azimuth of the liquid crystal molecules in the second domain is substantially 225°; or an alignment azimuth of the liquid crystal molecules in the first domain is substantially 135° and an alignment azimuth of the liquid crystal molecules in the second domain is substantially 315';
the alignment azimuth of the liquid crystal molecules in the first domain forms an angle of substantially 45° with a first direction from the first domain toward the second domain; the first direction being parallel to the longitudinal direction of the pixel; and the alignment azimuth of the liquid crystal molecules in the second domain forms an angle of substantially 45° with a second direction from the second domain toward the first domain; the second direction being parallel to the longitudinal direction of the pixel;
each pixel electrode includes
a first slitted region in which a plurality of first slits extending along a direction that is parallel to the alignment azimuth of the liquid crystal molecules in the first domain are formed,
a second slitted region in which a plurality of second slits extending along a direction that is parallel to the alignment azimuth of the liquid crystal molecules in the second domain are formed, and
a boundary region provided between the first slitted region and the second slitted region;

the boundary region includes a first end portion, a central portion, and a second end portion that are arranged along the transverse direction of the pixel; and no slits are formed in the first and second end portions of the boundary region, and at least one third slit is formed in the central portion of the boundary region.

2. The liquid crystal display panel of claim 1, wherein the third slit merges with an end of one first slit among the plurality of first slits that is closer to the boundary region, and merges with an end of one second slit among the plurality of second slits that is closer to the boundary region, such that the first slit is connected to the second slit.

3. The liquid crystal display panel of claim 2, wherein the third slit extends along the longitudinal direction of the pixel.

4. The liquid crystal display panel of claim 1, wherein the third slit is at a predetermined interval from ends of the first slits that are closer to the boundary region, and at a predetermined interval from ends of the second slits that are closer to the boundary region, such that the first slits and the second slits are not connected.

5. A liquid crystal display panel having a display mode that is a vertical alignment (VA) mode, comprising:
a plurality of rectangular-shaped pixels;
a first substrate section including a first substrate and pixel electrodes;
a liquid crystal layer provided on the first substrate section, the liquid crystal layer containing liquid crystal molecules; and
a second substrate section provided on the liquid crystal layer, the second substrate section including a second substrate and a counter electrode, wherein:
the plurality of pixels each include first and second domains arranged along a longitudinal direction of the pixel;
when a direction orthogonal to the longitudinal direction of the pixel is defined as a transverse direction of the pixel and an azimuth flush with the transverse direction of the pixel is defined as 0°, an alignment azimuth of the liquid crystal molecules in the first domain is substantially 45" and an alignment azimuth of the liquid crystal molecules in the second domain is substantially 225°; or an alignment azimuth of the liquid crystal molecules in the first domain is substantially 135° and an alignment azimuth of the liquid crystal molecules in the second domain is substantially 315°,
each pixel electrode includes
a first slitted region in which a plurality of first slits extending along a direction that is parallel to the alignment azimuth of the liquid crystal molecules in the first domain are formed,
a second slitted region in which a plurality of second slits extending along a direction that is parallel to the alignment azimuth of the liquid crystal molecules in the second domain are formed, and
a boundary region provided between the first slitted region and the second slitted region;
the boundary region includes a first end portion, a central portion, and a second end portion that are arranged along the transverse direction of the pixel;
no slits are formed in the first and second end portions of the boundary region, and at least one third slit is formed in the central portion of the boundary region;
the third slit merges with an end of one first slit among the plurality of first slits that is closer to the boundary region, and merges with an end of one second slit among the plurality of second slits that is closer to the boundary region, such that the first slit is connected to the second slit; and
the third slit extends along the transverse direction of the pixel.

6. The liquid crystal display panel of claim 1, wherein:
among ends of the plurality of first slits that are closer to the boundary region, an end that is adjacent to the central portion of the boundary region is located more toward an opposite side from the boundary region than are ends that are adjacent to the first and second end portions of the boundary region; and
among ends of the plurality of second slits that are closer to the boundary region, an end that is adjacent to the central portion of the boundary region is located more toward an opposite side from the boundary region than are ends that are adjacent to the first and second end portions of the boundary region.

7. The liquid crystal display panel of claim 1, wherein a figure that is presented by the plurality of first slits, the plurality of second slits, and the third slit is a point-symmetric figure.

* * * * *